(12) United States Patent
Seok

(10) Patent No.: US 9,585,165 B2
(45) Date of Patent: Feb. 28, 2017

(54) METHOD AND APPARATUS FOR ACCESSING CHANNEL USING NULL DATA PACKET IN WIRELESS LAN SYSTEM

(71) Applicant: LG ELECTRONICS INC., Seoul (KR)

(72) Inventor: Yongho Seok, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/414,342

(22) PCT Filed: Jul. 15, 2013

(86) PCT No.: PCT/KR2013/006300
§ 371 (c)(1),
(2) Date: Jan. 12, 2015

(87) PCT Pub. No.: WO2014/011006
PCT Pub. Date: Jan. 16, 2014

(65) Prior Publication Data
US 2015/0208436 A1 Jul. 23, 2015

Related U.S. Application Data

(60) Provisional application No. 61/671,670, filed on Jul. 13, 2012, provisional application No. 61/733,888, filed on Dec. 5, 2012.

(51) Int. Cl.
*H04W 84/08* (2009.01)
*H04W 74/00* (2009.01)
(Continued)

(52) U.S. Cl.
CPC ......... *H04W 74/002* (2013.01); *H04W 74/08* (2013.01); *H04W 84/12* (2013.01)

(58) Field of Classification Search
CPC .... H04W 74/002; H04W 74/08; H04W 84/12
See application file for complete search history.

(56) References Cited

U.S. PATENT DOCUMENTS

2009/0225697 A1* 9/2009 Solomon ............. H04W 72/046
370/328
2010/0165896 A1* 7/2010 Gong ................ H04W 52/0216
370/311
(Continued)

FOREIGN PATENT DOCUMENTS

| JP | 2006-014028 | 1/2006 |
|---|---|---|
| JP | 2006-319444 | 11/2006 |

(Continued)

OTHER PUBLICATIONS

PCT International Application No. PCT/KR2013/006300, Written Opinion of the International Searching Authority dated Nov. 7, 2013, 15 pages.

(Continued)

*Primary Examiner* — Andrew Lai
*Assistant Examiner* — M Mostazir Rahman
(74) *Attorney, Agent, or Firm* — Lee Hong Degerman Kang Waimey

(57) ABSTRACT

The present invention relates to a wireless communication system, and more specifically, disclosed are a method and an apparatus using a null data packet frame in a wireless LAN system. A method for a first station (STA) receiving a null data packet (NDP) type frame in the wireless communication system, according to one embodiment of the present invention, comprises the steps of: receiving from a second STA the NDP type frame including a specific frame transmission point offset field; and determining whether to perform an action triggered by the NDP type frame by comparing a value of the specific frame transmission point offset (Continued)

field, and the difference in values of the transmission point of the specific frame and the transmission point of the NDP type frame.

9 Claims, 19 Drawing Sheets

(51) Int. Cl.
*H04W 74/08* (2009.01)
*H04W 84/12* (2009.01)

(56) References Cited

U.S. PATENT DOCUMENTS

| | | | |
|---|---|---|---|
| 2012/0033614 A1 | 2/2012 | Sampath et al. | |
| 2012/0076179 A1 | 3/2012 | Stacey et al. | |
| 2012/0087358 A1 | 4/2012 | Zhu et al. | |
| 2012/0177018 A1* | 7/2012 | Abraham | H04L 1/0027 370/338 |
| 2012/0263126 A1* | 10/2012 | Choi | H04B 7/0617 370/329 |
| 2013/0058273 A1* | 3/2013 | Wentink | H04B 7/0452 370/328 |
| 2013/0272137 A1* | 10/2013 | Kwon | H04W 72/042 370/241 |

FOREIGN PATENT DOCUMENTS

| | | |
|---|---|---|
| JP | 2010114809 | 5/2010 |
| JP | 2012-129655 | 7/2012 |
| JP | 2012517780 | 8/2012 |
| JP | 2013544472 | 12/2013 |
| WO | 2010/093819 | 8/2010 |
| WO | 2011/068985 | 6/2011 |
| WO | 2011/115408 | 9/2011 |
| WO | 2011/115431 | 9/2011 |
| WO | 2012064837 | 5/2012 |
| WO | 2012/087054 | 6/2012 |

OTHER PUBLICATIONS

Takeuchi, et al., "Quick Data-retrieving for U-APSD in IEEE 80211e WLAN Networks," Wireless Communications and Networking Conference, 2006, XP031387410, Apr. 2006, pp. 1421-1427.
Seok, et al., "NDP Sounding," doc.: IEEE 802.11-12/0617r0, May 2012, 14 pages.
Liu, et al., "Short Ack," doc.: IEEE 802.11-12/0324r2, XP068038636, Mar. 2012, 15 pages.
Kwon, et al., "NDP Type PS-Poll Frame," doc.: IEEE 802.11-12/0848r0, Jul. 2012, 16 pages.
European Patent Office Application Serial No. 13816795.2, Search Report dated Jan. 27, 2016, 7 pages.

\* cited by examiner

FIG. 18
(a) Legacy PPDU format 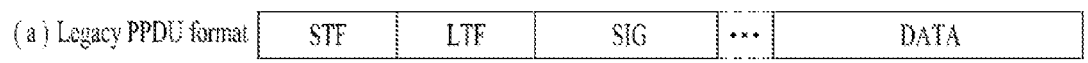
(b) Legacy PS-Poll frame format (MAC frame format) 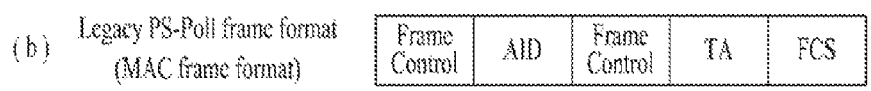
(c) NDP frame format 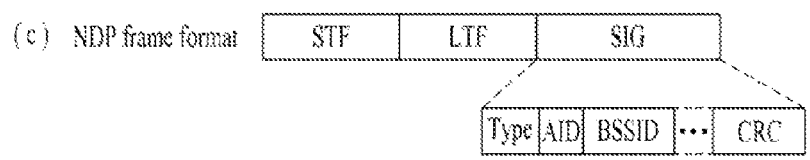
(d) ND PACK frame format 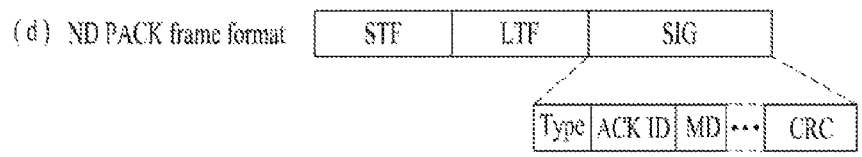

METHOD AND APPARATUS FOR ACCESSING CHANNEL USING NULL DATA PACKET IN WIRELESS LAN SYSTEM

CROSS-REFERENCE TO RELATED APPLICATIONS

This application is the National Stage filing under 35 U.S.C. 371 of International Application No. PCT/KR2013/006300, filed on Jul. 15, 2013, which claims the benefit of U.S. Provisional Application Ser. No. 61/671,670, filed on Jul. 13, 2012, and 61/733,888, filed on Dec. 5, 2012, the contents of which are all hereby incorporated by reference herein in their entirety.

FIELD OF THE INVENTION

The present invention relates to a wireless communication system, and more particularly to a method and apparatus for performing channel access using a null data packet (NDP) frame in a wireless LAN system.

BACKGROUND ART

Various wireless communication technologies systems have been developed with rapid development of information communication technologies. WLAN technology from among wireless communication technologies allows wireless Internet access at home or in enterprises or at a specific service provision region using mobile terminals, such as a Personal Digital Assistant (PDA), a laptop computer, a Portable Multimedia Player (PMP), etc. on the basis of Radio Frequency (RF) technology.

In order to obviate limited communication speed, one of the disadvantages of WLAN, the recent technical standard has proposed an evolved system capable of increasing the speed and reliability of a network while simultaneously extending a coverage region of a wireless network. For example, IEEE 802.11n enables a data processing speed to support a maximum high throughput (HT) of 540 Mbps. In addition, Multiple Input and Multiple Output (MIMO) technology has recently been applied to both a transmitter and a receiver so as to minimize transmission errors as well as to optimize a data transfer rate.

DETAILED DESCRIPTION OF THE INVENTION

Technical Problem

Machine to Machine (M2M) communication technology has been discussed as next generation communication technology. A technical standard for supporting M2M communication in IEEE 802.11 WLAN has been developed as IEEE 802.11ah. M2M communication may sometimes consider a scenario capable of communicating a small amount of data at low speed in an environment including a large number of devices.

Communication in the WLAN system is performed in a medium shared by all devices. If the number of devices as in the case of M2M communication increases, consumption of a long time for channel access of a single device may unavoidably deteriorate the entire system throughput, and may prevent power saving of the respective devices.

An object of the present invention is to provide a new frame format and a new channel access method to reduce not only a duration time consumed for channel access but also power consumption of the device.

It is to be understood that technical objects to be achieved by the present invention are not limited to the aforementioned technical objects and other technical objects which are not mentioned herein will be apparent from the following description to one of ordinary skill in the art to which the present invention pertains.

Technical Solution

The object of the present invention can be achieved by providing a method for receiving a Null Data Packet (NDP)-type frame by a first station (STA) in a wireless communication system, the method including: receiving the NDP-type frame including a specific frame transmission time offset field from a second station (STA); and comparing a value of the specific frame transmission time offset field with a difference value between a transmission time of the specific frame and a transmission time of the NDP-type frame, and determining whether to perform an operation triggered by the NDP-type frame according to the result of comparison.

In accordance with another aspect of the present invention, a station (STA) device for performing channel access receiving a Null Data Packet (NDP)-type frame in a wireless communication system includes: a transceiver; and a processor, wherein the processor receives the NDP-type frame including a specific frame transmission time offset field from other station (STA), compares a value of the specific frame transmission time offset field with a difference value between a transmission time of the specific frame and a transmission time of the NDP-type frame, and determines whether to perform an operation triggered by the NDP-type frame according to the result of comparison.

The following description may be commonly applied to the embodiments of the present invention.

The method may further include: if a value of the specific frame transmission time offset field is identical to the difference value in transmission time between the specific frame and the NDP-type frame, deciding to perform an operation triggered by the NDP-type frame; and if a value of the specific frame transmission time offset field is different from the difference value in transmission time between the specific frame and the NDP-type frame, deciding not to perform an operation triggered by the NDP-type frame.

The NDP-type frame may be a PLCP (Physical Layer Convergence Protocol) Packet Data Unit (PPDU) frame including a Short Training Field (STF), a Long Training Field (LTF), and a signal (SIG) field without inclusion of a data field, wherein the specific frame transmission time offset field is contained in the SIG field.

The specific frame transmission time offset field may be a previous target beacon transmission time offset field or a previous NDP Announcement (NDPA) offset field.

The NDP-type frame may be an NDP PS (Power Saving)-Poll frame or an NDP trigger frame.

The operation triggered by the NDP-type frame may include an operation for transmitting an acknowledgement (ACK) frame or a data frame to the second STA.

The ACK frame may be another NDP-type frame, and the SIG field of the ACK frame may include an ACK ID (identifier) field and a More Data (MD) bit field.

The ACK ID field may be set to a specific value that is based on an AID (Association ID) or partial AID field contained in the NDP-type frame and a BSSID (Basic Service Set ID) or partial BSSID (Partial BSSID) field.

The specific frame may be transmitted to the second STA by the first STA, before the first STA receives the NDP-type frame from the second STA.

The first STA may be an access point (AP) STA, and the second STA is a non-AP STA.

The NDP-type frame may be an NDP PS (Power Saving)-Poll frame or an NDP sounding feedback reporting Poll frame.

The operation triggered by the NDP-type frame may include an operation for transmitting a feedback reporting frame to the second STA.

The specific frame may be received from the second STA by the first STA, before the first STA receives the NDP-type frame from the second STA.

The first STA may be a non-AP STA, and the second STA is an AP STA.

It is to be understood that both the foregoing general description and the following detailed description of the present invention are exemplary and explanatory and are intended to provide further explanation of the invention as claimed.

Effects of the Invention

As is apparent from the above description, the embodiments of the present invention provide a new frame format and a new channel access method to reduce not only a time consumed for channel access but also power consumption of the device.

It will be appreciated by persons skilled in the art that the effects that can be achieved with the present invention are not limited to what has been particularly described hereinabove and other advantages of the present invention will be more clearly understood from the following detailed description taken in conjunction with the accompanying drawings.

BRIEF DESCRIPTION OF THE DRAWINGS

The accompanying drawings, which are included to provide a further understanding of the invention, illustrate embodiments of the invention and together with the description serve to explain the principle of the invention.

FIG. 18 is a conceptual diagram illustrating an NDP frame format according to an exemplary embodiment.

BEST MODE FOR CARRYING OUT THE INVENTION

Figure 1:
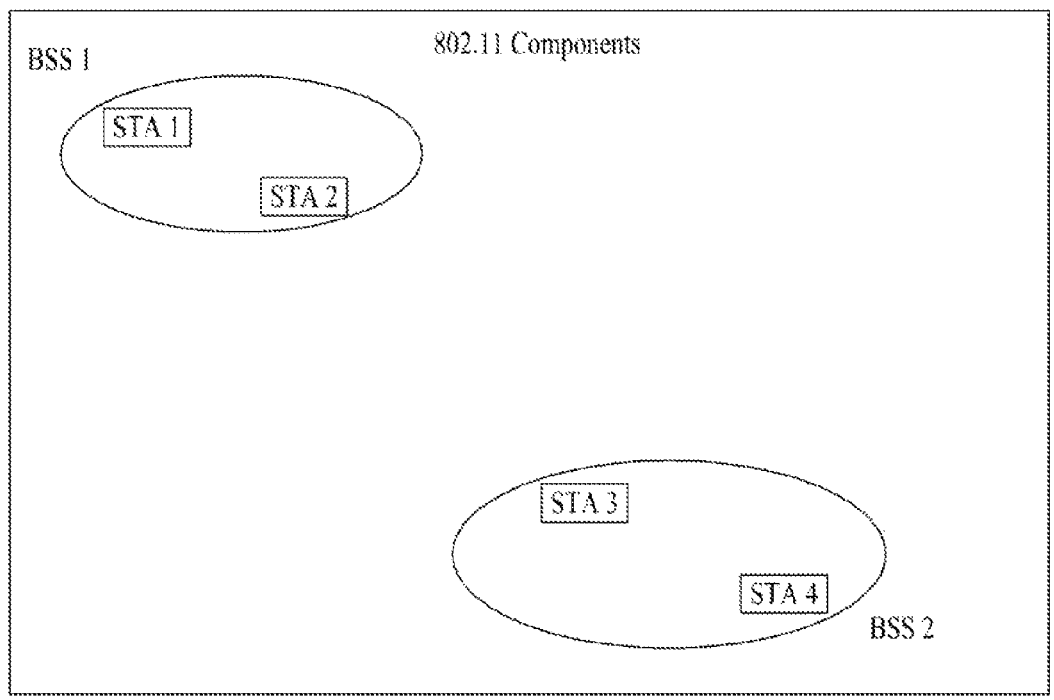
FIG. 1 exemplarily shows an IEEE 802.11 system according to one embodiment of the present invention.

Reference will now be made in detail to the preferred embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the present invention. The following detailed description includes specific details in order to provide a thorough understanding of the present invention. However, it will be apparent to those skilled in the art that the present invention may be practiced without such specific details.

The following embodiments are proposed by combining constituent components and characteristics of the present invention according to a predetermined format. The individual constituent components or characteristics should be considered optional factors on the condition that there is no additional remark. If required, the individual constituent components or characteristics may not be combined with other components or characteristics. In addition, some constituent components and/or characteristics may be combined to implement the embodiments of the present invention. The order of operations to be disclosed in the embodiments of the present invention may be changed. Some components or characteristics of any embodiment may also be included in other embodiments, or may be replaced with those of the other embodiments as necessary.

It should be noted that specific terms disclosed in the present invention are proposed for convenience of description and better understanding of the present invention, and the use of these specific terms may be changed to other formats within the technical scope or spirit of the present invention.

In some instances, well-known structures and devices are omitted in order to avoid obscuring the concepts of the present invention and important functions of the structures and devices are shown in block diagram form. The same reference numbers will be used throughout the drawings to refer to the same or like parts.

Exemplary embodiments of the present invention are supported by standard documents disclosed for at least one of wireless access systems including an Institute of Electrical and Electronics Engineers (IEEE) 802 system, a $3^{rd}$ Generation Partnership Project (3GPP) system, a 3GPP Long Term Evolution (LTE) system, an LTE-Advanced (LTE-A) system, and a 3GPP2 system. In particular, steps or parts, which are not described to clearly reveal the technical idea of the present invention, in the embodiments of the present invention may be supported by the above documents. All terminology used herein may be supported by at least one of the above-mentioned documents.

The following embodiments of the present invention can be applied to a variety of wireless access technologies, for example, CDMA (Code Division Multiple Access), FDMA (Frequency Division Multiple Access), TDMA (Time Division Multiple Access), OFDMA (Orthogonal Frequency Division Multiple Access), SC-FDMA (Single Carrier Frequency Division Multiple Access), and the like. CDMA may be embodied through wireless (or radio) technology such as UTRA (Universal Terrestrial Radio Access) or CDMA2000. TDMA may be embodied through wireless (or radio) technology such as GSM (Global System for Mobile communication)/GPRS (General Packet Radio Service)/EDGE (Enhanced Data Rates for GSM Evolution). OFDMA may be embodied through wireless (or radio) technology such as Institute of Electrical and Electronics Engineers (IEEE) 802.11 (Wi-Fi), IEEE 802.16 (WiMAX), IEEE 802-20, and E-UTRA (Evolved UTRA). For clarity, the following description focuses on IEEE 802.11 systems. However, technical features of the present invention are not limited thereto.

WLAN System Structure

FIG. 1 exemplarily shows an IEEE 802.11 system according to one embodiment of the present invention.

The structure of the IEEE 802.11 system may include a plurality of components. A WLAN which supports transparent STA mobility for a higher layer may be provided by mutual operations of the components. A Basic Service Set (BSS) may correspond to a basic constituent block in an IEEE 802.11 LAN. In FIG. 1, two BSSs (BSS1 and BSS2) are shown and two STAs are included in each of the BSSs (i.e. STA1 and STA2 are included in BSS1 and STA3 and STA4 are included in BSS2). An ellipse indicating the BSS in FIG. 1 may be understood as a coverage area in which STAs included in the corresponding BSS maintain communication. This area may be referred to as a Basic Service Area (BSA). If an STA moves out of the BSA, the STA cannot directly communicate with the other STAs in the corresponding BSA.

In the IEEE 802.11 LAN, the most basic type of BSS is an Independent BSS (IBSS). For example, the IBSS may have a minimum form consisting of only two STAs. The BSS (BSS1 or BSS2) of FIG. 1, which is the simplest form and in which other components are omitted, may correspond to a typical example of the IBSS. Such configuration is possible when STAs can directly communicate with each other. Such a type of LAN is not prescheduled and may be configured when the LAN is necessary. This may be referred to as an ad-hoc network.

Memberships of an STA in the BSS may be dynamically changed when the STA is switched on or off or the STA enters or leaves the BSS region. The STA may use a synchronization process to join the BSS. To access all services of a BSS infrastructure, the STA should be associated with the BSS. Such association may be dynamically configured and may include use of a Distribution System Service (DSS).

Figure 2:
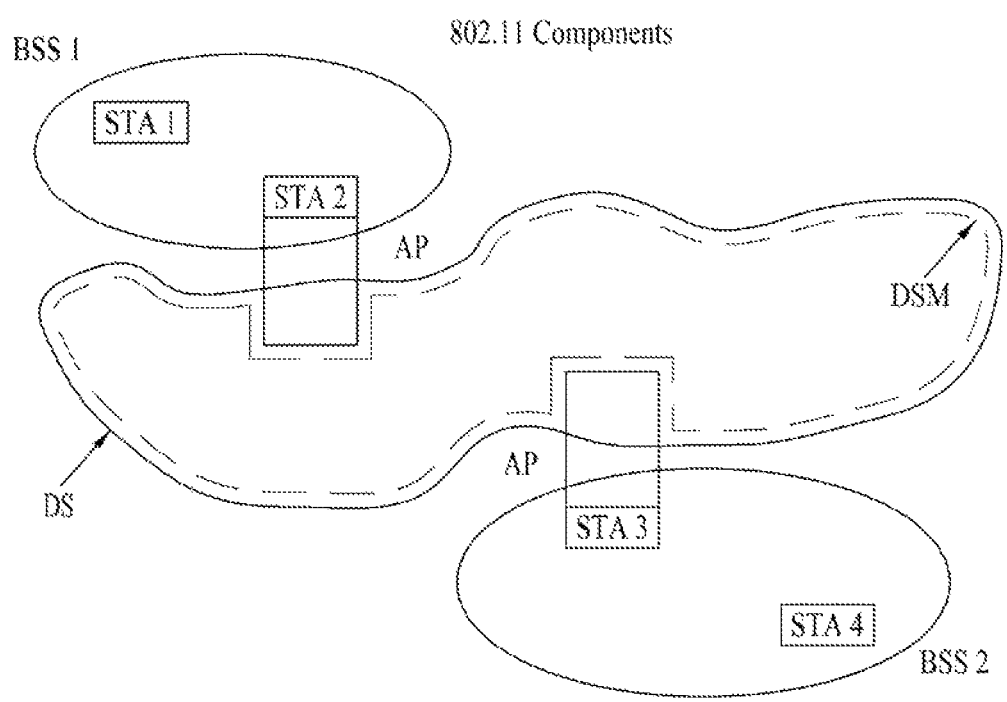
FIG. 2 exemplarily shows an IEEE 802.11 system according to another embodiment of the present invention.

FIG. 2 is a diagram showing another exemplary structure of an IEEE 802.11 system to which the present invention is applicable. In FIG. 2, components such as a Distribution System (DS), a Distribution System Medium (DSM), and an Access Point (AP) are added to the structure of FIG. 1.

A direct STA-to-STA distance in a LAN may be restricted by PHY performance. In some cases, such restriction of the distance may be sufficient for communication. However, in other cases, communication between STAs over a long distance may be necessary. The DS may be configured to support extended coverage.

The DS refers to a structure in which BSSs are connected to each other. Specifically, a BSS may be configured as a component of an extended form of a network consisting of a plurality of BSSs, instead of independent configuration as shown in FIG. 1.

The DS is a logical concept and may be specified by the characteristic of the DSM. In relation to this, a Wireless Medium (WM) and the DSM are logically distinguished in IEEE 802.11. Respective logical media are used for different purposes and are used by different components. In definition of IEEE 802.11, such media are not restricted to the same or different media. The flexibility of the IEEE 802.11 LAN architecture (DS architecture or other network architectures) can be explained in that a plurality of media is logically different. That is, the IEEE 802.11 LAN architecture can be variously implemented and may be independently specified by a physical characteristic of each implementation.

The DS may support mobile devices by providing seamless integration of multiple BSSs and providing logical services necessary for handling an address to a destination.

The AP refers to an entity that enables associated STAs to access the DS through a WM and that has STA functionality. Data may move between the BSS and the DS through the AP. For example, STA2 and STA3 shown in FIG. 2 have STA functionality and provide a function of causing associated STAs (STA1 and STA4) to access the DS. Moreover, since all APs correspond basically to STAs, all APs are addressable entities. An address used by an AP for communication on the WM need not always be identical to an address used by the AP for communication on the DSM.

Data transmitted from one of STAs associated with the AP to an STA address of the AP may always be received by an uncontrolled port and may be processed by an IEEE 802.1X port access entity. If the controlled port is authenticated, transmission data (or frame) may be transmitted to the DS.

Figure 3:
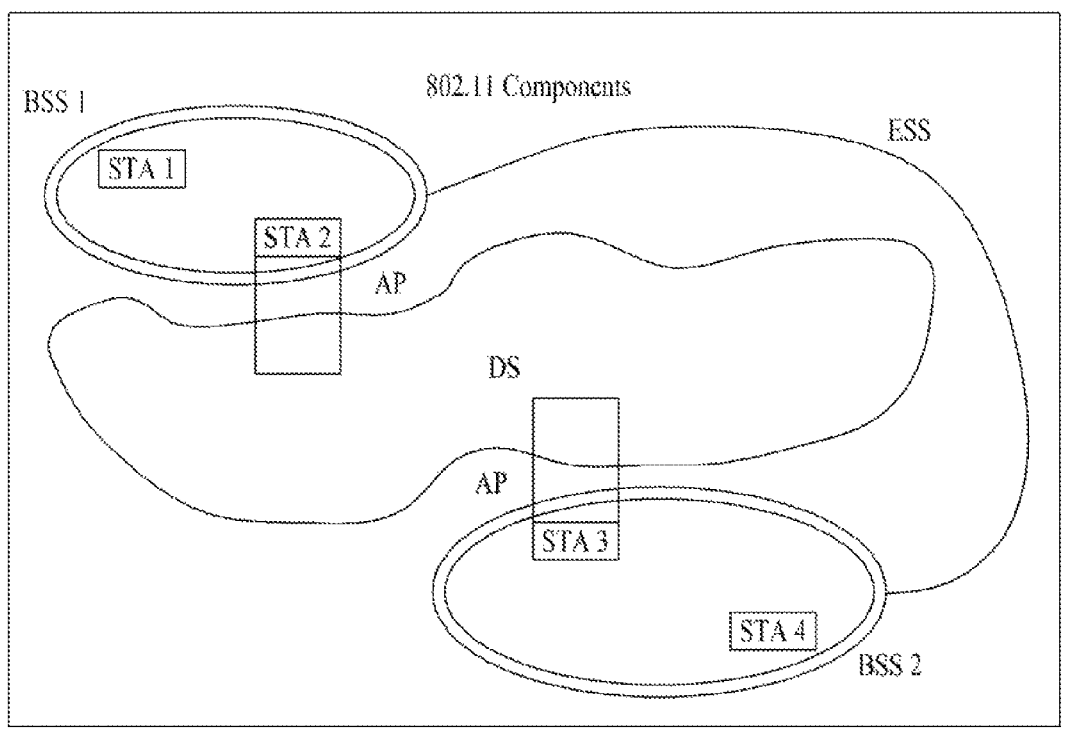
FIG. 3 exemplarily shows an IEEE 802.11 system according to still another embodiment of the present invention.

FIG. 3 is a diagram showing still another exemplary structure of an IEEE 802.11 system to which the present invention is applicable. In addition to the structure of FIG. 2, FIG. 3 conceptually shows an Extended Service Set (ESS) for providing wide coverage.

A wireless network having arbitrary size and complexity may be comprised of a DS and BSSs. In the IEEE 802.11 system, such a type of network is referred to as an ESS network. The ESS may correspond to a set of BSSs connected to one DS. However, the ESS does not include the DS. The ESS network is characterized in that the ESS network appears as an IBSS network in a Logical Link Control (LLC) layer. STAs included in the ESS may communicate with each other and mobile STAs are movable transparently in LLC from one BSS to another BSS (within the same ESS).

In IEEE 802.11, relative physical locations of the BSSs in FIG. 3 are not assumed and the following forms are all possible. BSSs may partially overlap and this form is generally used to provide continuous coverage. BSSs may not be physically connected and the logical distances between BSSs have no limit. BSSs may be located at the same physical position and this form may be used to provide redundancy. One or more IBSSs or ESS networks may be physically located in the same space as one or more ESS networks. This may correspond to an ESS network form in the case in which an ad-hoc network operates in a location in which an ESS network is present, the case in which IEEE 802.11 networks of different organizations physically overlap, or the case in which two or more different access and security policies are necessary in the same location.

Figure 4:
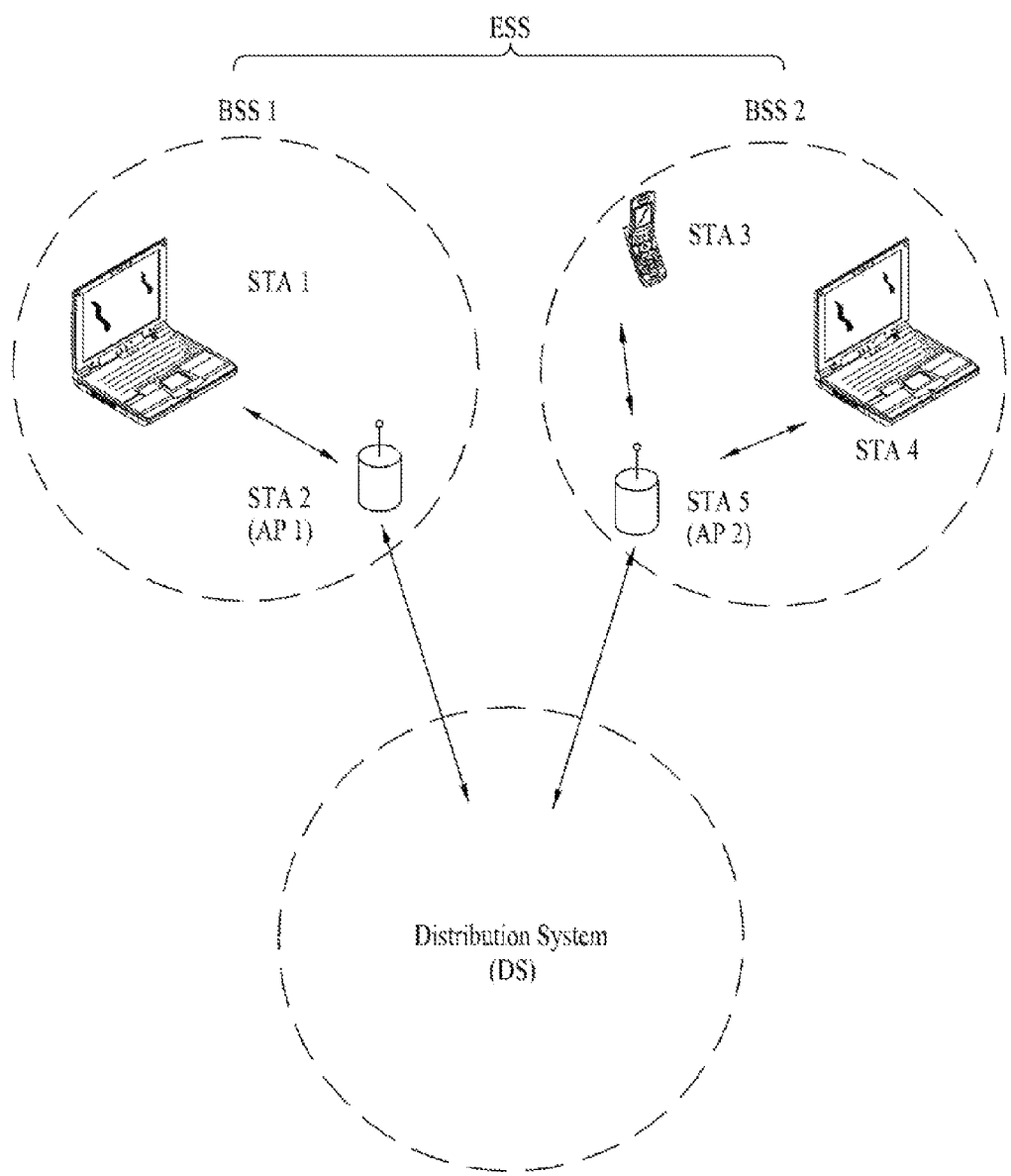
FIG. 4 is a conceptual diagram illustrating a WLAN system.

FIG. 4 is a diagram showing an exemplary structure of a WLAN system. In FIG. 4, an example of an infrastructure BSS including a DS is shown.

In the example of FIG. 4, BSS1 and BSS2 constitute an ESS. In the WLAN system, an STA is a device operating according to MAC/PHY regulation of IEEE 802.11. STAs include AP STAs and non-AP STAs. The non-AP STAs correspond to devices, such as laptop computers or mobile phones, handled directly by users. In FIG. 4, STA1, STA3, and STA4 correspond to the non-AP STAs and STA2 and STA5 correspond to AP STAs.

In the following description, the non-AP STA may be referred to as a terminal, a Wireless Transmit/Receive Unit (WTRU), a User Equipment (UE), a Mobile Station (MS), a mobile terminal, or a Mobile Subscriber Station (MSS). The AP is a concept corresponding to a Base Station (BS), a Node-B, an evolved Node-B (e-NB), a Base Transceiver System (BTS), or a femto BS in other wireless communication fields.

Link Setup Process

Figure 5:
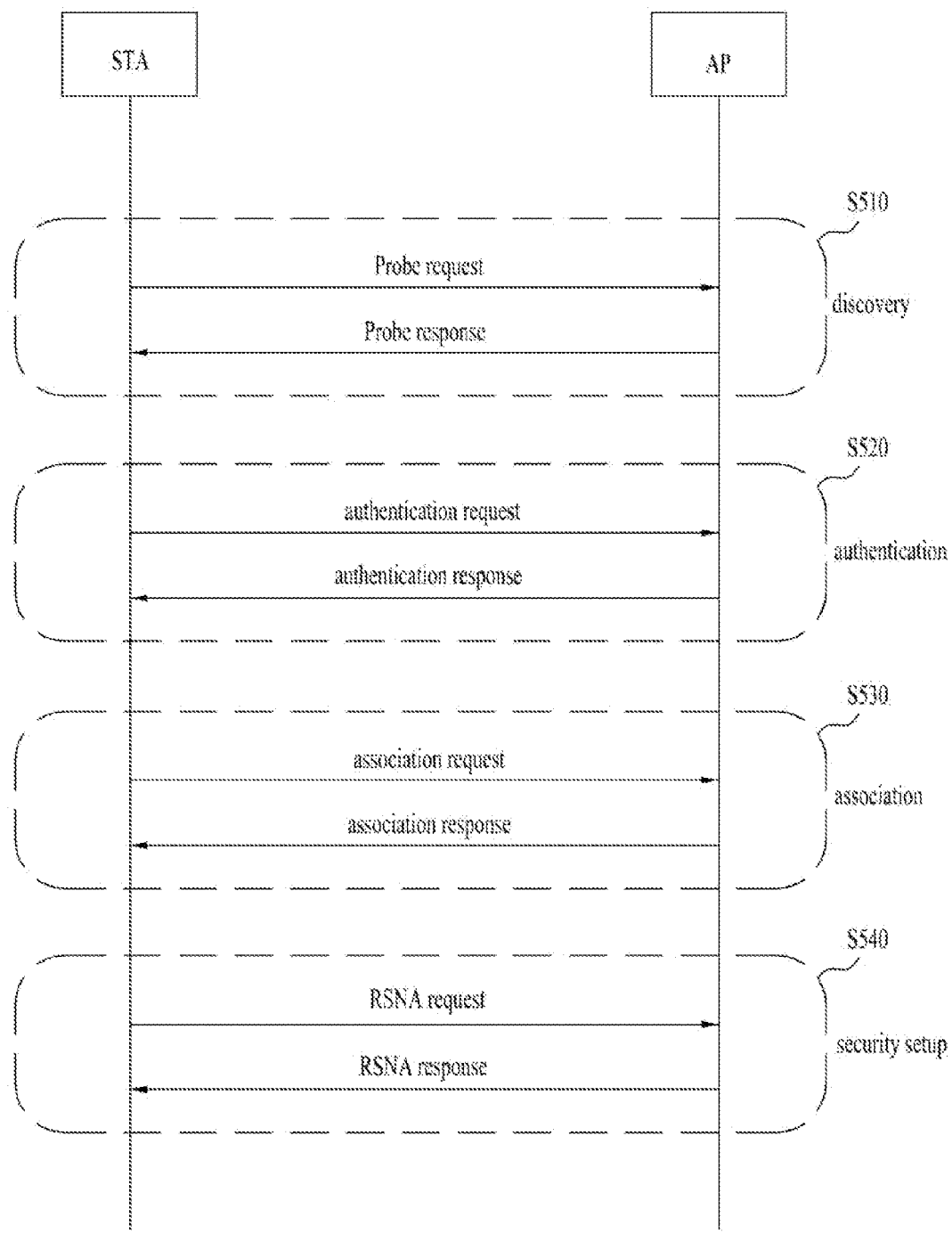
FIG. 5 is a flowchart illustrating a link setup process for use in the WLAN system.

FIG. 5 is a flowchart explaining a general link setup process according to an exemplary embodiment of the present invention.

In order to allow an STA to establish link setup on the network as well as to transmit/receive data over the network, the STA must perform such link setup through processes of network discovery, authentication, and association, and must establish association and perform security authentication. The link setup process may also be referred to as a session initiation process or a session setup process. In addition, an association step is a generic term for discovery, authentication, association, and security setup steps of the link setup process.

Link setup process is described referring to FIG. 5.

In step S510, STA may perform the network discovery action. The network discovery action may include the STA scanning action. That is, STA must search for an available network so as to access the network. The STA must identify a compatible network before participating in a wireless network. Here, the process for identifying the network contained in a specific region is referred to as a scanning process.

The scanning scheme is classified into active scanning and passive scanning.

FIG. 5 is a flowchart illustrating a network discovery action including an active scanning process. In the case of the active scanning, an STA configured to perform scanning transmits a probe request frame and waits for a response to the probe request frame, such that the STA can move between channels and at the same time can determine which AP (Access Point) is present in a peripheral region. A responder transmits a probe response frame, acting as a response to the probe request frame, to the STA having transmitted the probe request frame. In this case, the responder may be an STA that has finally transmitted a beacon frame in a BSS of the scanned channel. In BSS, since the AP transmits the beacon frame, the AP operates as a responder. In IBSS, since STAs of the IBSS sequentially transmit the beacon frame, the responder is not constant. For example, the STA, that has transmitted the probe request frame at Channel #1 and has received the probe response frame at Channel #1, stores BSS-associated information contained in the received probe response frame, and moves to the next channel (for example, Channel #2), such that the STA may perform scanning using the same method (i.e., probe request/response transmission/reception at Channel #2).

Although not shown in FIG. 5, the scanning action may also be carried out using passive scanning. An STA configured to perform scanning in the passive scanning mode waits for a beacon frame while simultaneously moving from one channel to another channel. The beacon frame is one of management frames in IEEE 802.11, indicates the presence of a wireless network, enables the STA performing scanning to search for the wireless network, and is periodically transmitted in a manner that the STA can participate in the wireless network. In BSS, the AP is configured to periodically transmit the beacon frame. In IBSS, STAs of the IBSS are configured to sequentially transmit the beacon frame. If each STA for scanning receives the beacon frame, the STA stores BSS information contained in the beacon frame, and moves to another channel and records beacon frame information at each channel. The STA having received the beacon frame stores BSS-associated information contained in the received beacon frame, moves to the next channel, and thus performs scanning using the same method.

In comparison between the active scanning and the passive scanning, the active scanning is more advantageous than the passive scanning in terms of delay and power consumption.

After the STA discovers the network, the STA may perform the authentication process in step S520. The authentication process may be referred to as a first authentication process in such a manner that the authentication process can be clearly distinguished from the security setup process of step S540.

The authentication process may include transmitting an authentication request frame to an AP by the STA, and transmitting an authentication response frame to the STA by the AP in response to the authentication request frame. The authentication frame used for authentication request/response may correspond to a management frame.

The authentication frame may include an authentication algorithm number, an authentication transaction sequence number, a state code, a challenge text, a Robust Security Network (RSN), a Finite Cyclic Group (FCG), etc. The above-mentioned information contained in the authentication frame may correspond to some parts of information capable of being contained in the authentication request/response frame, may be replaced with other information, or may include additional information.

The STA may transmit the authentication request frame to the AP. The AP may decide whether to authenticate the corresponding STA on the basis of information contained in the received authentication request frame. The AP may provide the authentication result to the STA through the authentication response frame.

After the STA has been successfully authenticated, the association process may be carried out in step S530. The association process may involve transmitting an association request frame to the AP by the STA, and transmitting an association response frame to the STA by the AP in response to the association request frame.

For example, the association request frame may include information associated with various capabilities, a beacon listen interval, a Service Set Identifier (SSID), supported rates, supported channels, RSN, mobility domain, supported operating classes, a TIM (Traffic Indication Map) broadcast request, interworking service capability, etc.

For example, the association response frame may include information associated with various capabilities, a state code, an Association ID (AID), supported rates, an Enhanced Distributed Channel Access (EDCA) parameter set, a Received Channel Power Indicator (RCPI), a Received Signal to Noise Indicator (RSNI), mobility domain, a timeout interval (association comeback time), an overlapping BSS scan parameter, a TIM broadcast response, a QoS map, etc.

The above-mentioned information may correspond to some parts of information capable of being contained in the association request/response frame, may be replaced with other information, or may include additional information.

After the STA has been successfully associated with the network, a security setup process may be carried out in step S540. The security setup process of Step S540 may be referred to as an authentication process based on Robust Security Network Association (RSNA) request/response. The authentication process of step S520 may be referred to as a first authentication process, and the security setup process of Step S540 may also be simply referred to as an authentication process.

For example, the security setup process of Step S540 may include a private key setup process through 4-way handshaking based on an (Extensible Authentication Protocol over LAN (EAPOL) frame. In addition, the security setup process may also be carried out according to other security schemes not defined in IEEE 802.11 standards.

WLAN Evolution

In order to obviate limitations in WLAN communication speed, IEEE 802.11n has recently been established as a communication standard. IEEE 802.11n aims to increase network speed and reliability as well as to extend a coverage region of the wireless network. In more detail, IEEE 802.11n supports a High Throughput (HT) of a maximum of 540 Mbps, and is based on MIMO technology in which multiple antennas are mounted to each of a transmitter and a receiver.

With the widespread use of WLAN technology and diversification of WLAN applications, there is a need to develop a new WLAN system capable of supporting a HT higher than a data processing speed supported by IEEE 802.11n. The next generation WLAN system for supporting Very High Throughput (VHT) is the next version (for example, IEEE 802.11ac) of the IEEE 802.11n WLAN system, and is one of IEEE 802.11 WLAN systems recently proposed to support a data process speed of 1 Gbps or more at a MAC SAP (Medium Access Control Service Access Point).

In order to efficiently utilize a radio frequency (RF) channel, the next generation WLAN system supports MU-MIMO (Multi User Multiple Input Multiple Output) transmission in which a plurality of STAs can simultaneously access a channel. In accordance with the MU-MIMO transmission scheme, the AP may simultaneously transmit packets to at least one MIMO-paired STA.

In addition, a technology for supporting WLAN system operations in whitespace has recently been discussed. For example, a technology for introducing the WLAN system in whitespace (TV WS) such as an idle frequency band (for example, 54~698 MHz band) left because of the transition to digital TV has been discussed under the IEEE 802.11af standard. However, the above-mentioned information is disclosed for illustrative purposes only, and the whitespace may be a licensed band capable of being primarily used only by a licensed user. The licensed user may be a user who has authority to use the licensed band, and may also be referred to as a licensed device, a primary user, an incumbent user, or the like.

For example, an AP and/or STA operating in the whitespace (WS) must provide a function for protecting the licensed user. For example, assuming that the licensed user such as a microphone has already used a specific WS channel acting as a divided frequency band on regulation in a manner that a specific bandwidth is occupied from the WS band, the AP and/or STA cannot use the frequency band corresponding to the corresponding WS channel so as to protect the licensed user. In addition, the AP and/or STA must stop using the corresponding frequency band under the condition that the licensed user uses a frequency band used for transmission and/or reception of a current frame.

Therefore, the AP and/or STA must determine whether to use a specific frequency band of the WS band. In other words, the AP and/or STA must determine the presence or absence of an incumbent user or a licensed user in the frequency band. The scheme for determining the presence or absence of the incumbent user in a specific frequency band is referred to as a spectrum sensing scheme. An energy detection scheme, a signature detection scheme and the like may be used as the spectrum sensing mechanism. The AP and/or STA may determine that the frequency band is being used by an incumbent user if the intensity of a received signal exceeds a predetermined value, or when a DTV preamble is detected.

M2M (Machine to Machine) communication technology has been discussed as next generation communication technology. Technical standard for supporting M2M communication has been developed as IEEE 802.11ah in the IEEE 802.11 WLAN system. M2M communication refers to a communication scheme including one or more machines, or may also be referred to as Machine Type Communication (MTC) or Machine To Machine (M2M) communication. In this case, the machine may be an entity that does not require direct handling and intervention of a user. For example, not only a meter or vending machine including a RF module, but also a user equipment (UE) (such as a smartphone) capable of performing communication by automatically accessing the network without user intervention/handling may be an example of such machines. M2M communication may include Device-to-Device (D2D) communication and communication between a device and an application server, etc. As exemplary communication between the device and the application server, communication between a vending machine and an application server, communication between the Point of Sale (POS) device and the application server, and communication between an electric meter, a gas meter or a water meter and the application server. M2M-based communication applications may include security, transportation, healthcare, etc. In the case of considering the above-mentioned application examples, M2M communication has to support the method for sometimes transmitting/receiving a small amount of data at low speed under an environment including a large number of devices.

In more detail, M2M communication must support a large number of STAs. Although the current WLAN system assumes that one AP is associated with a maximum of 2007 STAs, various methods for supporting other cases in which many more STAs (e.g., about 6000 STAs) are associated with one AP have recently been discussed in M2M communication. In addition, it is expected that many applications for supporting/requesting a low transfer rate are present in M2M communication. In order to smoothly support many STAs, the WLAN system may recognize the presence or absence of data to be transmitted to the STA on the basis of a TIM (Traffic Indication map), and various methods for reducing the bitmap size of the TIM have recently been discussed. In addition, it is expected that much traffic data having a very long transmission/reception interval is present in M2M communication. For example, in M2M communication, a very small amount of data (e.g., electric/gas/water metering) needs to be transmitted at long intervals (for example, every month). Therefore, although the number of STAs associated with one AP increases in the WLAN system, many developers and companies are conducting intensive research into an WLAN system which can efficiently support the case in which there are a very small number of STAs, each of which has a data frame to be received from the AP during one beacon period.

As described above, WLAN technology is rapidly developing, and not only the above-mentioned exemplary technologies but also other technologies such as a direct link setup, improvement of media streaming throughput, high-speed and/or support of large-scale initial session setup, and support of extended bandwidth and operation frequency, are being intensively developed.

Medium Access Mechanism

In the IEEE 802.11-based WLAN system, a basic access mechanism of MAC (Medium Access Control) is a Carrier Sense Multiple Access with Collision Avoidance (CSMA/CA) mechanism. The CSMA/CA mechanism is referred to as a Distributed Coordination Function (DCF) of IEEE 802.11 MAC, and basically includes a "Listen Before Talk" access mechanism. In accordance with the above-mentioned access mechanism, the AP and/or STA may perform Clear Channel Assessment (CCA) for sensing an RF channel or medium during a predetermined time interval [for example, DCF Inter-Frame Space (DIFS)], prior to data transmission. If it is determined that the medium is in the idle state, frame transmission through the corresponding medium begins. On the other hand, if it is determined that the medium is in the occupied state, the corresponding AP and/or STA does not start its own transmission, establishes a delay time (for example, a random backoff period) for medium access, and attempts to start frame transmission after waiting for a predetermined time. Through application of a random back-off period, it is expected that multiple STAs will attempt to start frame transmission after waiting for different times, resulting in minimum collision.

In addition, IEEE 802.11 MAC protocol provides a Hybrid Coordination Function (HCF). HCF is based on DCF and Point Coordination Function (PCF). PCF refers to the polling-based synchronous access scheme in which periodic polling is executed in a manner that all reception (Rx) APs and/or STAs can receive the data frame. In addition, HCF includes Enhanced Distributed Channel Access (EDCA) and HCF Controlled Channel Access (HCCA). EDCA is achieved when the access scheme provided from a provider to a plurality of users is contention-based. HCCA is achieved by the contention-free-based channel access scheme based on the polling mechanism. In addition, HCF includes a medium access mechanism for improving Quality of Service (QoS) of WLAN, and may transmit QoS data in both a Contention Period (CP) and a Contention Free Period (CFP).

Figure 6:
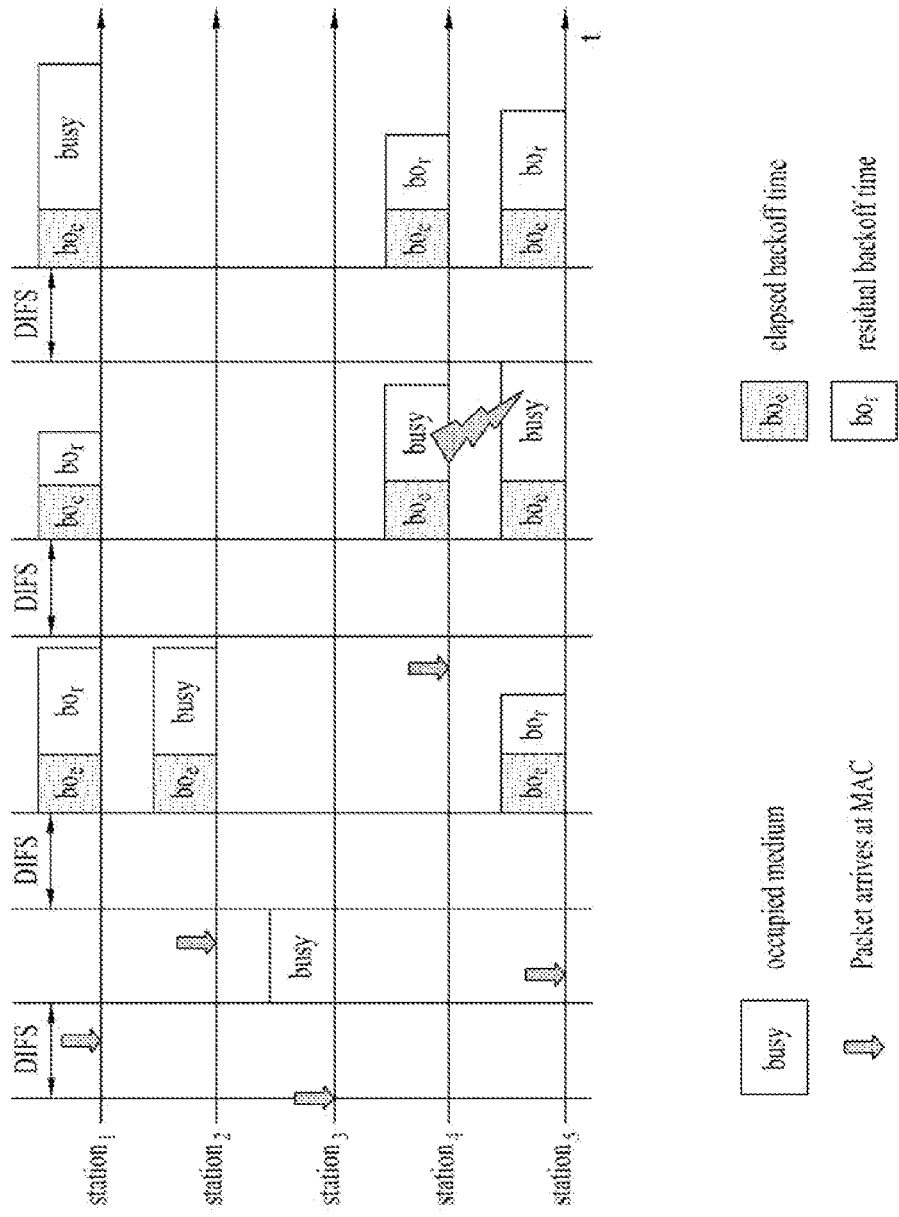
FIG. 6 is a conceptual diagram illustrating a backoff process.

FIG. 6 is a conceptual diagram illustrating a backoff process.

Operations based on a random backoff period will hereinafter be described with reference to FIG. 6. If the occupy- or busy-state medium is shifted to an idle state, several STAs may attempt to transmit data (or frame). As a method for implementing a minimum number of collisions, each STA selects a random backoff count, waits for a slot time corresponding to the selected backoff count, and then attempts to start data transmission. The random backoff count is a pseudo-random integer, and may be set to one of 0 to CW values. In this case, CW refers to a Contention Window parameter value. Although an initial value of the CW parameter is denoted by CWmin, the initial value may be doubled in case of a transmission failure (for example, in the case in which ACK of the transmission frame is not received). If the CW parameter value is denoted by CWmax, CWmax is maintained until data transmission is successful, and at the same time it is possible to attempt to start data transmission. If data transmission was successful, the CW parameter value is reset to CWmin. Preferably, CW, CWmin, and CWmax are set to $2^n-1$ (where n=0, 1, 2, . . . ).

If the random backoff process starts operation, the STA continuously monitors the medium while counting down the backoff slot in response to the decided backoff count value. If the medium is monitored as the occupied state, the countdown stops and waits for a predetermined time. If the medium is in the idle state, the remaining countdown restarts.

As shown in the example of FIG. 6, if a packet to be transmitted to MAC of STA3 arrives at the STA3, the STA3 determines whether the medium is in the idle state during the DIFS, and may directly start frame transmission. In the meantime, the remaining STAs monitor whether the medium is in the busy state, and wait for a predetermined time. During the predetermined time, data to be transmitted may occur in each of STA1, STA2, and STA5. If the medium is in the idle state, each STA waits for the DIFS time and then performs countdown of the backoff slot in response to a random backoff count value selected by each STA. The example of FIG. 6 shows that STA2 selects the lowest backoff count value and STA1 selects the highest backoff count value. That is, after STA2 finishes backoff counting, the residual backoff time of STA5 at a frame transmission start time is shorter than the residual backoff time of STA1. Each of STA1 and STA5 temporarily stops countdown while STA2 occupies the medium, and waits for a predetermined time. If occupying of the STA2 is finished and the medium re-enters the idle state, each of STA1 and STA5 waits for a predetermined time DIFS, and restarts backoff counting. That is, after the remaining backoff slot as long as the residual backoff time is counted down, frame transmission may start operation. Since the residual backoff time of STA5 is shorter than that of STA1, STA5 starts frame transmission. Meanwhile, data to be transmitted may occur in STA4 while STA2 occupies the medium. In this case, if the medium is in the idle state, STA4 waits for the DIFS time, performs countdown in response to the random backoff count value selected by the STA4, and then starts frame transmission. FIG. 6 exemplarily shows the case in which the residual backoff time of STA5 is identical to the random backoff count value of STA4 by chance. In this case, an unexpected collision may occur between STA4 and STA5. If the collision occurs between STA4 and STA5, each of STA4 and STA5 does not receive ACK, resulting in the occurrence of a failure in data transmission. In this case, each of STA4 and STA5 increases the CW value two times, and STA4 or STA5 may select a random backoff count value and then perform countdown. Meanwhile, STA1 waits for a predetermined time while the medium is in the occupied state due to transmission of STA4 and STA5. In this case, if the medium is in the idle state, STA1 waits for the DIFS time, and then starts frame transmission after lapse of the residual backoff time.

STA Sensing Operation

As described above, the CSMA/CA mechanism includes not only a physical carrier sensing mechanism in which the AP and/or STA can directly sense the medium, but also a virtual carrier sensing mechanism. The virtual carrier sensing mechanism can solve some problems (such as a hidden node problem) encountered in the medium access. For the virtual carrier sensing, MAC of the WLAN system can utilize a Network Allocation Vector (NAV). In more detail, by means of the NAV value, the AP and/or STA, each of which currently uses the medium or has authority to use the medium, may inform another AP and/or another STA for the remaining time in which the medium is available. Accordingly, the NAV value may correspond to a reserved time in which the medium will be used by the AP and/or STA configured to transmit the corresponding frame. An STA having received the NAV value may prohibit medium access (or channel access) during the corresponding reserved time. For example, NAV may be set according to the value of a 'duration' field of the MAC header of the frame.

The robust collision detect mechanism has been proposed to reduce the probability of such collision, and as such a detailed description thereof will hereinafter be described with reference to FIGS. 7 and 8. Although an actual carrier sensing range is different from a transmission range, it is assumed that the actual carrier sensing range is identical to the transmission range for convenience of description and better understanding of the present invention.

Figure 7:
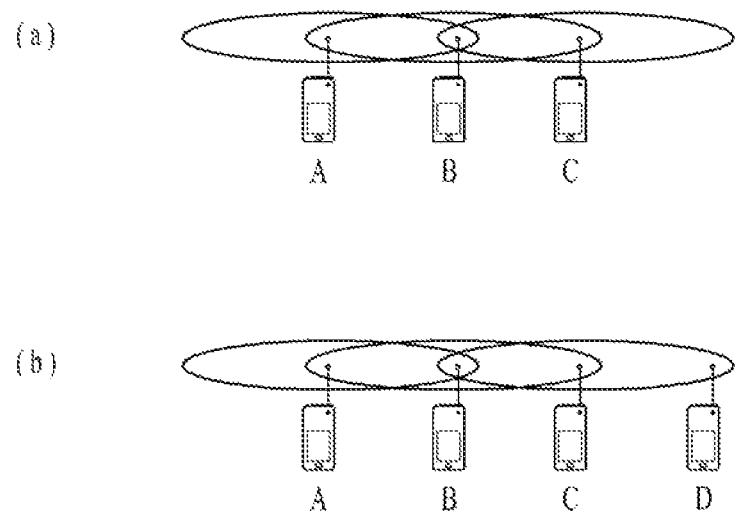
FIG. 7 is a conceptual diagram illustrating a hidden node and an exposed node.

FIG. 7 is a conceptual diagram illustrating a hidden node and an exposed node.

FIG. 7(*a*) exemplarily shows the hidden node. In FIG. 7(*a*), STA A communicates with STA B, and STA C has information to be transmitted. In FIG. 7(*a*), STA C may determine that the medium is in the idle state when performing carrier sensing before transmitting data to STA B, under the condition that STA A transmits information to STA B. Since transmission of STA A (i.e., occupied medium) may not be detected at the location of STA C, it is determined that the medium is in the idle state. In this case, STA B simultaneously receives information of STA A and information of STA C, resulting in the occurrence of collision. Here, STA A may be considered as a hidden node of STA C.

FIG. 7(*b*) exemplarily shows an exposed node. In FIG. 7(*b*), under the condition that STA B transmits data to STA A, STA C has information to be transmitted to STA D. If STA C performs carrier sensing, it is determined that the medium is occupied due to transmission of STA B. Therefore, although STA C has information to be transmitted to STA D, the medium-occupied state is sensed, such that the STA C must wait for a predetermined time (i.e., standby mode) until the medium is in the idle state. However, since STA A is actually located out of the transmission range of STA C, transmission from STA C may not collide with transmission from STA B from the viewpoint of STA A, such that STA C unnecessarily enters the standby mode until STA B stops transmission. Here, STA C is referred to as an exposed node of STA B.

Figure 8:
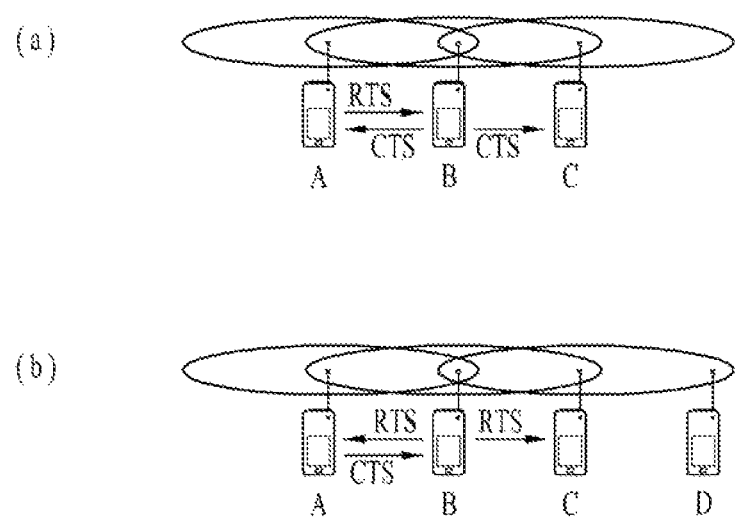
FIG. 8 is a conceptual diagram illustrating RTS (Request To Send) and CTS (Clear To Send).

FIG. 8 is a conceptual diagram illustrating RTS (Request To Send) and CTS (Clear To Send).

In order to efficiently utilize the collision avoidance mechanism under the above-mentioned situation of FIG. 7, it is possible to use a short signaling packet such as RTS (request to send) and CTS (clear to send). RTS/CTS between two STAs may be overheard by peripheral STA(s), such that the peripheral STA(s) may consider whether information is communicated between the two STAs. For example, if STA to be used for data transmission transmits the RTS frame to the STA having received data, the STA having received data transmits the CTS frame to peripheral STAs, and may inform the peripheral STAs that the STA is going to receive data.

FIG. 8(*a*) exemplarily shows the method for solving problems of the hidden node. In FIG. 8(*a*), it is assumed that each of STA A and STA C is ready to transmit data to STA B. If STA A transmits RTS to STA B, STA B transmits CTS to each of STA A and STA C located in the vicinity of the STA B. As a result, STA C must wait for a predetermined time until STA A and STA B stop data transmission, such that collision is prevented from occurring.

FIG. 8(*b*) exemplarily shows the method for solving problems of the exposed node. STA C performs overhearing of RTS/CTS transmission between STA A and STA B, such that STA C may determine no collision although it transmits data to another STA (for example, STA D). That is, STA B transmits an RTS to all peripheral STAs, and only STA A having data to be actually transmitted can transmit a CTS. STA C receives only the RTS and does not receive the CTS of STA A, such that it can be recognized that STA A is located outside of the carrier sensing range of STA C.

Power Management

As described above, the WLAN system has to perform channel sensing before STA performs data transmission/reception. The operation of always sensing the channel causes persistent power consumption of the STA. There is not much difference in power consumption between the reception (Rx) state and the transmission (Tx) state. Continuous maintenance of the Rx state may cause large load to a power-limited STA (i.e., STA operated by a battery). Therefore, if STA maintains the Rx standby mode so as to persistently sense the channel, power is inefficiently consumed without special advantages in terms of WLAN throughput. In order to solve the above-mentioned problem, the WLAN system supports a power management (PM) mode of the STA.

The PM mode of the STA is classified into an active mode and a Power Save (PS) mode. The STA is basically operated in the active mode. The STA operating in the active mode maintains an awake state. If the STA is in the awake state, the STA may normally operate such that it can perform frame transmission/reception, channel scanning, or the like. On the other hand, STA operating in the PS mode is configured to switch from the doze state to the awake state or vice versa. STA operating in the sleep state is operated with minimum power, and the STA does not perform frame transmission/reception and channel scanning.

The amount of power consumption is reduced in proportion to a specific time in which the STA stays in the sleep state, such that the STA operation time is increased in response to the reduced power consumption. However, it is impossible to transmit or receive the frame in the sleep state, such that the STA cannot mandatorily operate for a long period of time. If there is a frame to be transmitted to the AP, the STA operating in the sleep state is switched to the awake state, such that it can transmit/receive the frame in the awake state. On the other hand, if the AP has a frame to be transmitted to the STA, the sleep-state STA is unable to receive the frame and cannot recognize the presence of a frame to be received. Accordingly, STA may need to switch to the awake state according to a specific period in order to recognize the presence or absence of a frame to be transmitted to the STA (or in order to receive a signal indicating the presence of the frame on the assumption that the presence of the frame to be transmitted to the STA is decided).

Figure 9:
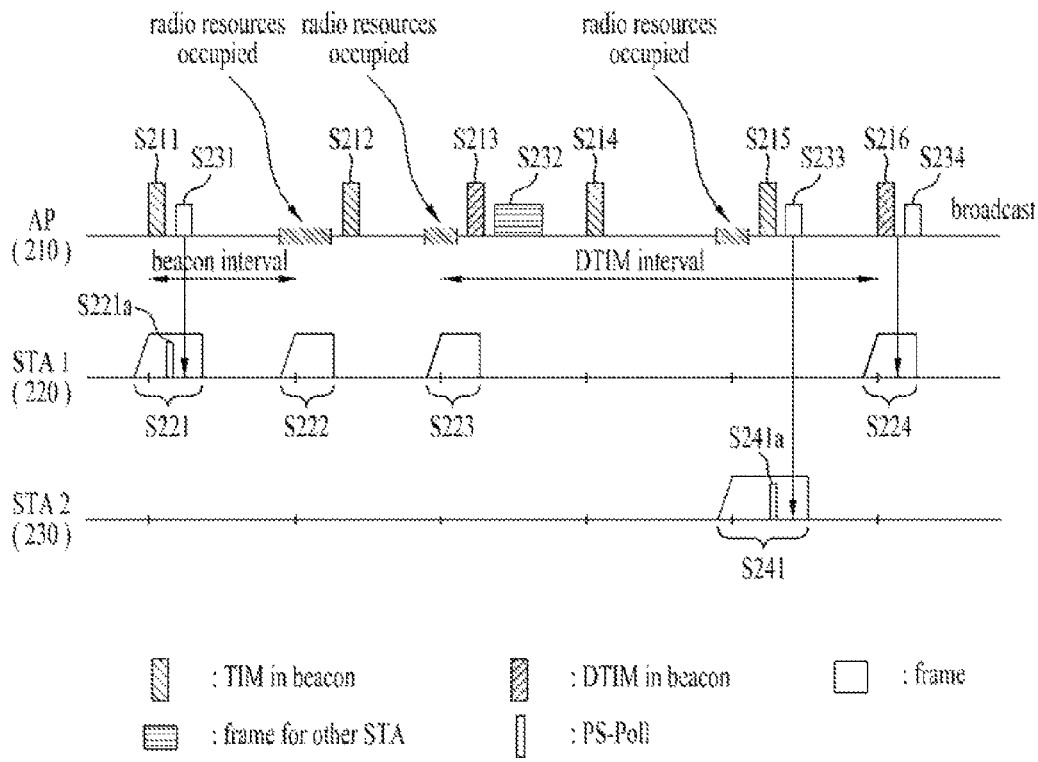
FIG. 9 is a conceptual diagram illustrating a power management operation.

FIG. 9 is a conceptual diagram illustrating a power management (PM) operation.

Referring to FIG. 9, AP 210 transmits a beacon frame to STAs present in the BSS at intervals of a predetermined time period in steps (S211, S212, S213, S214, S215, S216). The beacon frame includes a TIM information element. The TIM information element includes buffered traffic regarding STAs associated with the AP 210, and includes specific information indicating that a frame is to be transmitted. The TIM information element includes a TIM for indicating a unicast frame and a Delivery Traffic Indication Map (DTIM) for indicating a multicast or broadcast frame.

AP 210 may transmit a DTIM once whenever the beacon frame is transmitted three times. Each of STA1 220 and STA2 222 is operated in the PS mode. Each of STA1 220 and STA2 222 is switched from the sleep state to the awake state every wakeup interval, such that STA1 220 and STA2 222 may be configured to receive the TIM information element transmitted by the AP 210. Each STA may calculate a switching start time at which each STA may start switching to the awake state on the basis of its own local clock. In FIG. 9, it is assumed that a clock of the STA is identical to a clock of the AP.

For example, the predetermined wakeup interval may be configured in such a manner that STA1 220 can switch to the awake state to receive the TIM element every beacon interval. Accordingly, STA1 220 may switch to the awake state in step S221 when AP 210 first transmits the beacon frame in step S211. STA1 220 receives the beacon frame, and obtains the TIM information element. If the obtained TIM element indicates the presence of a frame to be transmitted to STA1 220, STA1 220 may transmit a Power Save-Poll (PS-Poll) frame, which requests the AP 210 to transmit the frame, to the AP 210 in step S221a. The AP 210 may transmit the frame to STA 1 220 in response to the PS-Poll frame in step S231. STA1 220 having received the frame is re-switched to the sleep state, and operates in the sleep state.

When AP 210 secondly transmits the beacon frame, a busy medium state in which the medium is accessed by another device is obtained, the AP 210 may not transmit the beacon frame at an accurate beacon interval and may transmit the beacon frame at a delayed time in step S212. In this case, although STA1 220 is switched to the awake state in response to the beacon interval, it does not receive the delay-transmitted beacon frame so that it re-enters the sleep state in step S222.

When AP 210 thirdly transmits the beacon frame, the corresponding beacon frame may include a TIM element denoted by DTIM. However, since the busy medium state is given, AP 210 transmits the beacon frame at a delayed time in step S213. STA1 220 is switched to the awake state in response to the beacon interval, and may obtain a DTIM through the beacon frame transmitted by the AP 210. It is assumed that DTIM obtained by STA1 220 does not have a frame to be transmitted to STA1 220 and there is a frame for another STA. In this case, STA1 220 confirms the absence of a frame to be received in the STA1 220, and re-enters the sleep state, such that the STA1 220 may operate in the sleep state. After the AP 210 transmits the beacon frame, the AP 210 transmits the frame to the corresponding STA in step S232.

AP 210 fourthly transmits the beacon frame in step S214. However, it is impossible for STA1 220 to obtain information regarding the presence of buffered traffic associated with the STA1 220 through double reception of a TIM element, such that the STA1 220 may adjust the wakeup interval for receiving the TIM element. Alternatively, provided that signaling information for coordination of the wakeup interval value of STA1 220 is contained in the beacon frame transmitted by AP 210, the wakeup interval value of the STA1 220 may be adjusted. In this example, STA1 220, that has been switched to receive a TIM element every beacon interval, may be switched to another operation state in which STA1 220 can awake from the sleep state once every three beacon intervals. Therefore, when AP 210 transmits a fourth beacon frame in step S214 and transmits a fifth beacon frame in step S215, STA1 220 maintains the sleep state such that it cannot obtain the corresponding TIM element.

When AP 210 sixthly transmits the beacon frame in step S216, STA1 220 is switched to the awake state and operates in the awake state, such that the STA1 220 is unable to obtain the TIM element contained in the beacon frame in step S224. The TIM element is a DTIM indicating the presence of a broadcast frame, such that STA1 220 does not transmit the PS-Poll frame to the AP 210 and may receive a broadcast frame transmitted by the AP 210 in step S234. In the meantime, the wakeup interval of STA2 230 may be longer than a wakeup interval of STA1 220. Accordingly, STA2 230 enters the awake state at a specific time S215 where the AP 210 fifthly transmits the beacon frame, such that the STA2 230 may receive the TIM element in step S241. STA2 230 recognizes the presence of a frame to be transmitted to the STA2 230 through the TIM element, and transmits the PS-Poll frame to the AP 210 so as to request frame transmission in step S241a. AP 210 may transmit the frame to STA2 230 in response to the PS-Poll frame in step S233.

In order to operate/manage the power save (PS) mode shown in FIG. 9, the TIM element may include either a TIM indicating the presence or absence of a frame to be transmitted to the STA, or a DTIM indicating the presence or absence of a broadcast/multicast frame. DTIM may be implemented through field setting of the TIM element.

Figure 10:
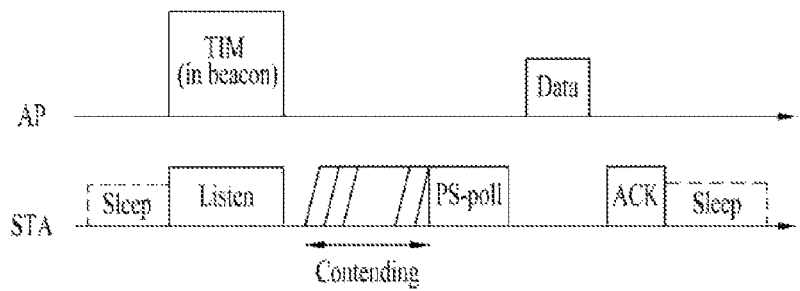
FIGS. 10 to 12 are conceptual diagrams illustrating detailed operations of a station (STA) having received a Traffic Indication Map (TIM).
Figure 11:
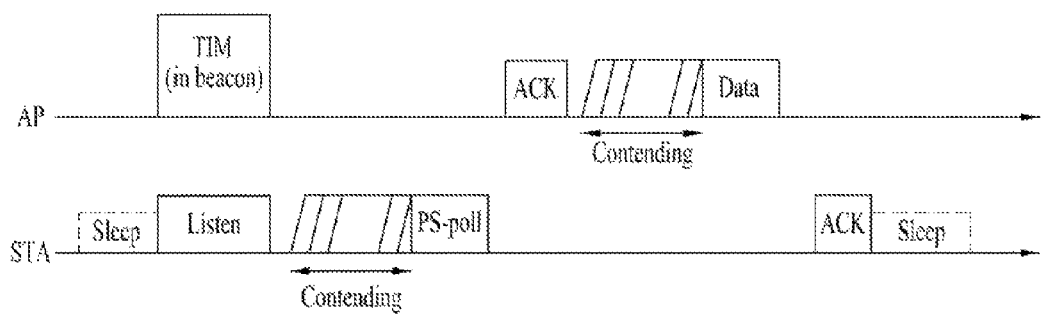
Figure 12:
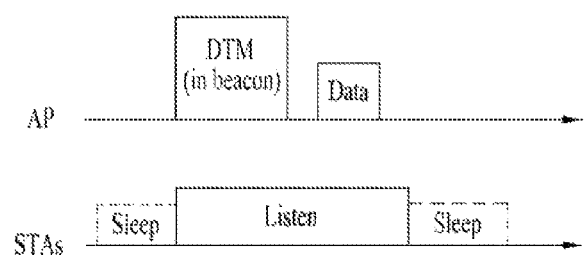

FIGS. 10 to 12 are conceptual diagrams illustrating detailed operations of the STA having received a Traffic Indication Map (TIM).

Referring to FIG. 10, STA is switched from the sleep state to the awake state so as to receive the beacon frame including a TIM from the AP. STA interprets the received TIM element such that it can recognize the presence or absence of buffered traffic to be transmitted to the STA. After STA contends with other STAs to access the medium for PS-Poll frame transmission, the STA may transmit the PS-Poll frame for requesting data frame transmission to the AP. The AP having received the PS-Poll frame transmitted by the STA may transmit the frame to the STA. STA may receive a data frame and then transmit an ACK frame to the AP in response to the received data frame. Thereafter, the STA may re-enter the sleep state.

As can be seen from FIG. 10, the AP may operate according to the immediate response scheme, such that the AP receives the PS-Poll frame from the STA and transmits the data frame after lapse of a predetermined time [for example, Short Inter-Frame Space (SIFS)]. In contrast, the AP having received the PS-Poll frame does not prepare a data frame to be transmitted to the STA during the SIFS time, such that the AP may operate according to the deferred response scheme, and as such a detailed description thereof will hereinafter be described with reference to FIG. 11.

The STA operations of FIG. 11 in which the STA is switched from the sleep state to the awake state, receives a TIM from the AP, and transmits the PS-Poll frame to the AP through contention are identical to those of FIG. 10. If the AP having received the PS-Poll frame does not prepare a data frame during the SIFS time, the AP may transmit the ACK frame to the STA instead of transmitting the data frame. If the data frame is prepared after transmission of the ACK frame, the AP may transmit the data frame to the STA after completion of such contending. STA may transmit the ACK frame indicating successful reception of a data frame to the AP, and may be shifted to the sleep state.

FIG. 12 shows the exemplary case in which AP transmits DTIM. STAs may be switched from the sleep state to the awake state so as to receive the beacon frame including a DTIM element from the AP. STAs may recognize that multicast/broadcast frame(s) will be transmitted through the received DTIM. After transmission of the beacon frame including the DTIM, AP may directly transmit data (i.e., multicast/broadcast frame) without transmitting/receiving the PS-Poll frame. While STAs continuously maintain the awake state after reception of the beacon frame including the DTIM, the STAs may receive data, and then switch to the sleep state after completion of data reception.

TIM Structure

In the operation and management method of the Power save (PS) mode based on the TIM (or DTIM) protocol shown in FIGS. 9 to 12, STAs may determine the presence or absence of a data frame to be transmitted for the STAs through STA identification information contained in the TIM element. STA identification information may be specific information associated with an Association Identifier (AID) to be allocated when an STA is associated with an AP.

AID is used as a unique ID of each STA within one BSS. For example, AID for use in the current WLAN system may be allocated to one of 1 to 2007. In the case of the current WLAN system, 14 bits for AID may be allocated to a frame transmitted by AP and/or STA. Although the AID value may be assigned a maximum of 16383, the values of 2008~16383 are set to reserved values.

The TIM element according to legacy definition is inappropriate for application of M2M application through which many STAs (for example, at least 2007 STAs) are associated with one AP. If the conventional TIM structure is extended without any change, the TIM bitmap size excessively increases, such that it is impossible to support the extended TIM structure using the legacy frame format, and the extended TIM structure is inappropriate for M2M communication in which application of a low transfer rate is considered. In addition, it is expected that there are a very small number of STAs each having an Rx data frame during one beacon period. Therefore, according to exemplary application of the above-mentioned M2M communication, it is expected that the TIM bitmap size is increased and most bits are set to zero (0), such that there is needed a technology capable of efficiently compressing such bitmap.

In the legacy bitmap compression technology, successive values (each of which is set to zero) of 0 are omitted from a head part of bitmap, and the omitted result may be defined as an offset (or start point) value. However, although STAs each including the buffered frame is small in number, if there is a high difference between AID values of respective STAs, compression efficiency is not high. For example, assuming that the frame to be transmitted to only a first STA having an AID of 10 and a second STA having an AID of 2000 is buffered, the length of a compressed bitmap is set to 1990, the remaining parts other than both edge parts are assigned zero (0). If STAs associated with one AP is small in number, inefficiency of bitmap compression does not cause serious problems. However, if the number of STAs associated with one AP increases, such inefficiency may deteriorate overall system throughput.

In order to solve the above-mentioned problems, AIDs are divided into a plurality of groups such that data can be more efficiently transmitted using the AIDs. A designated group ID (GID) is allocated to each group. AIDs allocated on the basis of such group will hereinafter be described with reference to FIG. 13.

Figure 13:
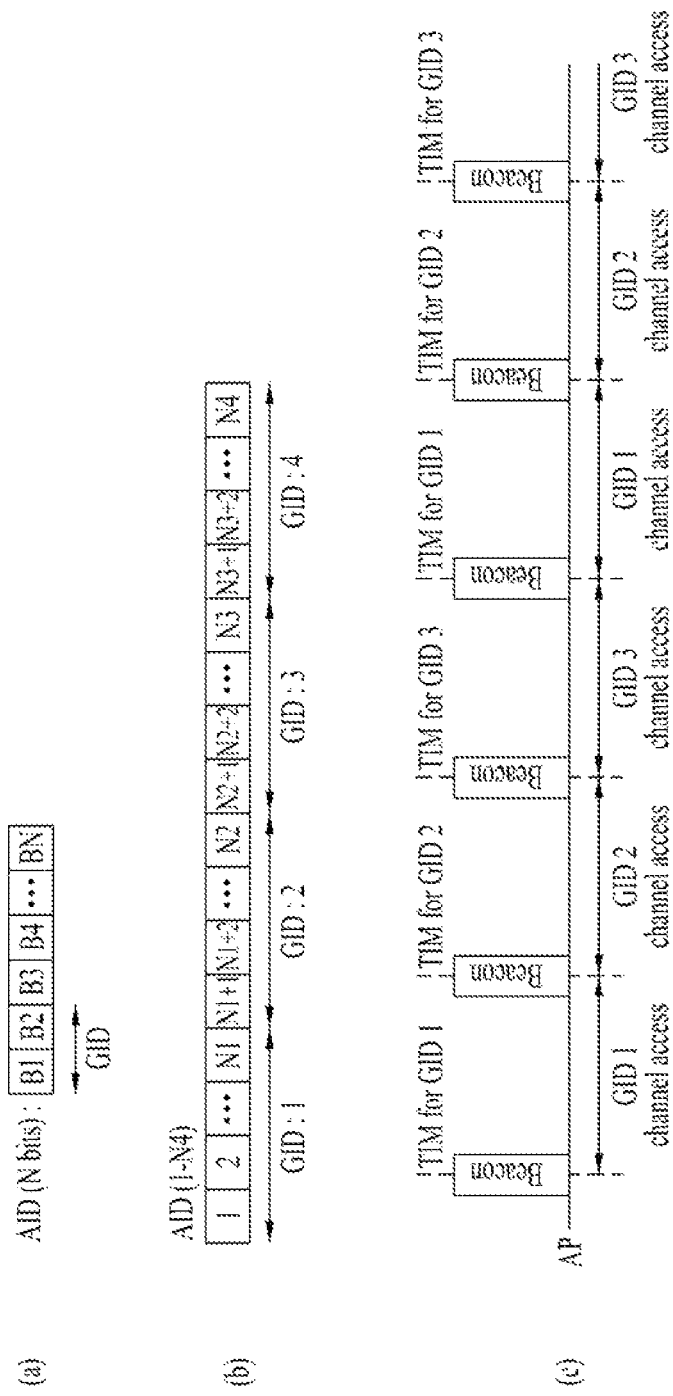
FIG. 13 is a conceptual diagram illustrating a group-based AID.

FIG. 13(*a*) is a conceptual diagram illustrating a group-based AID. In FIG. 13(*a*), some bits located at the front part of the AID bitmap may be used to indicate a group ID (GID). For example, it is possible to designate four GIDs using the first two bits of an AID bitmap. If a total length of the AID bitmap is denoted by N bits, the first two bits (B1 and B2) may represent a GID of the corresponding AID.

FIG. 13(*b*) is a conceptual diagram illustrating a group-based AID. In FIG. 13(*b*), a GID may be allocated according to the position of AID. In this case, AIDs having the same GID may be represented by offset and length values. For example, if GID 1 is denoted by Offset A and Length B, this means that AIDs (A~A+B−1) on bitmap are respectively set to GID 1. For example, FIG. 13(*b*) assumes that AIDs (1~N4) are divided into four groups. In this case, AIDs contained in GID 1 are denoted by 1~N1, and the AIDs contained in this group may be represented by Offset 1 and Length N1. AIDs contained in GID 2 may be represented by Offset (N1+1) and Length (N2−N1+1), AIDs contained in GID 3 may be represented by Offset (N2+1) and Length (N3−N2+1), and AIDs contained in GID 4 may be represented by Offset (N3+1) and Length (N4−N3+1).

In case of using the aforementioned group-based AIDs, channel access is allowed in a different time interval according to individual GIDs, the problem caused by the insufficient number of TIM elements compared with a large number of STAs can be solved and at the same time data can be efficiently transmitted/received. For example, during a specific time interval, channel access is allowed only for STA(s) corresponding to a specific group, and channel access to the remaining STA(s) may be restricted. A predetermined time interval in which access to only specific STA(s) is allowed may also be referred to as a Restricted Access Window (RAW).

Channel access based on GID will hereinafter be described with reference to FIG. 13(*c*). If AIDs are divided into three groups, the channel access mechanism according to the beacon interval is exemplarily shown in FIG. 13(c). A first beacon interval (or a first RAW) is a specific interval in which channel access to an STA corresponding to an AID contained in GID 1 is allowed, and channel access of STAs contained in other GIDs is disallowed. For implementation of the above-mentioned structure, a TIM element used only for AIDs corresponding to GID 1 is contained in a first beacon frame. A TIM element used only for AIDs corresponding to GID 2 is contained in a second beacon frame. Accordingly, only channel access to an STA corresponding to the AID contained in GID 2 is allowed during a second beacon interval (or a second RAW) during a second beacon interval (or a second RAW). A TIM element used only for AIDs having GID 3 is contained in a third beacon frame, such that channel access to an STA corresponding to the AID contained in GID 3 is allowed using a third beacon interval (or a third RAW). A TIM element used only for AIDs each having GID 1 is contained in a fourth beacon frame, such that channel access to an STA corresponding to the AID contained in GID 1 is allowed using a fourth beacon interval (or a fourth RAW). Thereafter, only channel access to an STA corresponding to a specific group indicated by the TIM contained in the corresponding beacon frame may be allowed in each of beacon intervals subsequent to the fifth beacon interval (or in each of RAWs subsequent to the fifth RAW).

Although FIG. 13(c) exemplarily shows that the order of allowed GIDs is periodical or cyclical according to the beacon interval, the scope or spirit of the present invention is not limited thereto. That is, only AID(s) contained in specific GID(s) may be contained in a TIM element, such that channel access to STA(s) corresponding to the specific AID(s) is allowed during a specific time interval (for example, a specific RAW), and channel access to the remaining STA(s) is disallowed.

The aforementioned group-based AID allocation scheme may also be referred to as a hierarchical structure of a TIM. That is, a total AID space is divided into a plurality of blocks, and channel access to STA(s) (i.e., STA(s) of a specific group) corresponding to a specific block having any one of the remaining values other than '0' may be allowed. Therefore, a large-sized TIM is divided into small-sized blocks/groups, STA can easily maintain TIM information, and blocks/groups may be easily managed according to class, QoS or usage of the STA. Although FIG. 13 exemplarily shows a 2-level layer, a hierarchical TIM structure comprised of two or more levels may be configured. For example, a total AID space may be divided into a plurality of page groups, each page group may be divided into a plurality of blocks, and each block may be divided into a plurality of sub-blocks. In this case, according to the extended version of FIG. 13(a), first N1 bits of AID bitmap may represent a page ID (i.e., PID), the next N2 bits may represent a block ID, the next N3 bits may represent a sub-block ID, and the remaining bits may represent the position of STA bits contained in a sub-block.

In the examples of the present invention, various schemes for dividing STAs (or AIDs allocated to respective STAs) into predetermined hierarchical group units, and managing the divided result may be applied to the embodiments, however, the group-based AID allocation scheme is not limited to the above examples.

Improved Channel Access Method

Figure 14:
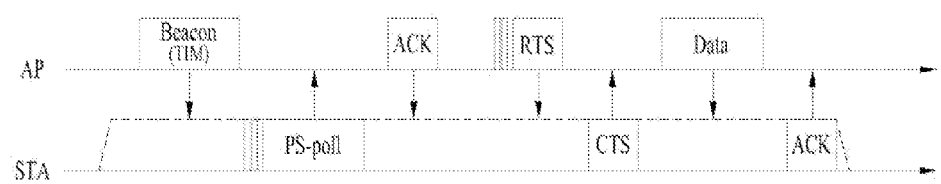
FIG. 14 is a conceptual diagram illustrating a PS-Poll mechanism.

FIG. 14 is a conceptual diagram illustrating a PS-Poll mechanism. In more detail, FIG. 14 is a detailed example of the PS-Poll mechanism shown in FIG. 11.

As described above, the STA may recognize the presence or absence of data to be transmitted from the AP to the STA through a TIM element of the beacon. The STA having recognized the presence of data to be transmitted thereto, and may transmit the PS-Poll frame to the AP so as to request data (i.e., DL data) from the AP. The AP having received the PS-Poll frame may transmit data to the STA through contention. In more detail, the AP configured to attempt to transmit data may transmit the RTS frame to the STA having received the data. The STA to be used for data reception transmits the CTS frame so that it can indicate that the STA is ready to receive data. Therefore, the AP may transmit a data frame to the STA, and may receive the ACK frame. In this case, the AP may transmit only one Physical layer Service Data Unit (PSDU) to the STA once. Therefore, if there is a large amount of data to be sent from the AP to the STA, the AP must transmit data through contention in response to a new PS-Poll from the STA, so that data transmission may be inefficiently carried out.

Figure 15:
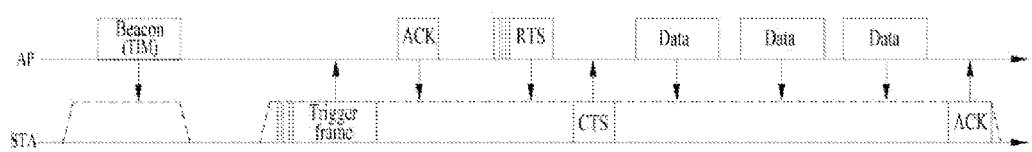
FIG. 15 is a conceptual diagram illustrating an Unscheduled-Automatic Power Save Delivery (U-APSD) mechanism.

FIG. 15 is a conceptual diagram illustrating an Unscheduled-Automatic Power Save Delivery (U-APSD) mechanism.

Referring to FIG. 15, according to the U-APSD (Unscheduled-Automatic Power Save Delivery) mechanism, in order to use a U-APSD SP, the STA can inform the AP of a requested transmission duration and the AP can transmit a frame to the STA for the SP. According to U-APSD mechanism, the STA can simultaneously receive a plurality of PSDUs from the AP.

Referring to FIG. 15, the STA may recognize the presence of data to be transmitted from the STA to the AP through the TIM element of the beacon. The STA can recognize that the AP has data to be sent thereto through a TIM element of a beacon. Then, the STA can request the AP to transmit while signaling to the AP that the SP of the STA starts by transmitting a trigger frame to the AP at a desired time. The AP can transmit ACK as a response to the trigger frame. Subsequently, the AP can transmit an RTS to the STA through contention, receive a CTS frame from the STA and then transmit data to the STA. Here, the data transmitted by the AP can be composed of one or more data frames. When the AP sets the end of service period (EOSP) of the last data frame to 1 and transmits the last data frame to the STA, the STA can recognize the EOSP and end the SP. Accordingly, the STA can transmit ACK indicating that the STA has successfully received the data. According to the U-APSD mechanism, the STA can start the SP thereof at a desired time to receive data and receive multiple data frames within a single SP, thereby achieving efficient data reception.

In the meantime, as shown in FIGS. 14 and 15, an exchange of the RTS/CTS frames during data Tx/Rx times so as to prevent the occurrence of the hidden node problem may cause a large amount of signaling overhead to both of the data transmission/reception sides. In addition, as shown in FIG. 15, a long period of time from a start time, at which the STA transmits the trigger frame and requests data transmission to the AP, to an end time, at which the AP prepares for data to be sent to the STA, transmits/receives the RTS/CTS frames through contention for data transmission and finally transmits data, is consumed so that a large amount of power of the STA may be consumed.

For example, under the hidden node environment, there may be an STA that cannot perform overhearing of the PS-Poll frames sent from other STAs, and PS-Poll frames may be simultaneously transferred from a plurality of STAs so that there may occur unexpected collision between the PS-Poll frames. Moreover, under the environment in which a large number of STAs can be associated with one AP as in M2M communication, the hidden node problem may more frequently occur. Although the legacy CTS/RTS frame exchange method for solving the hidden node problem is used, power consumption caused by transmission/reception (Tx/Rx) of the CTS/RTS frames may cause large load in case of low-power STA, etc. appropriate for M2M communication.

In order to address this issue, the following description will disclose a new method for enabling the STA operating in the PS mode to perform channel access.

For this purpose, the present invention provides a slot-based operation scheme when the STA performs the channel access operation (e.g., when the STA transmits the PS-Poll frame to the AP). For example, a time period corresponding to the slot may be longer than the Tx time of the PS-Poll frame. In the present invention, the channel sensing period of the STA may be established in units of a slot longer than the PS-Poll time, so that it is possible to solve the problem in which the PS-Poll frame of another STA cannot be overheard in the hidden node environment. In addition, the STA of the present invention performs channel sensing only in some time sections instead of the entire slot time, so that power consumption of the STA can be reduced and at the same time the channel sensing can be efficiently carried out. The present invention proposes a method for using a null data packet (NDP). For example, the NDP frame may be used in association with the DL channel access or the UL channel access.

Slot Based Channel Access Operation

Figure 16:
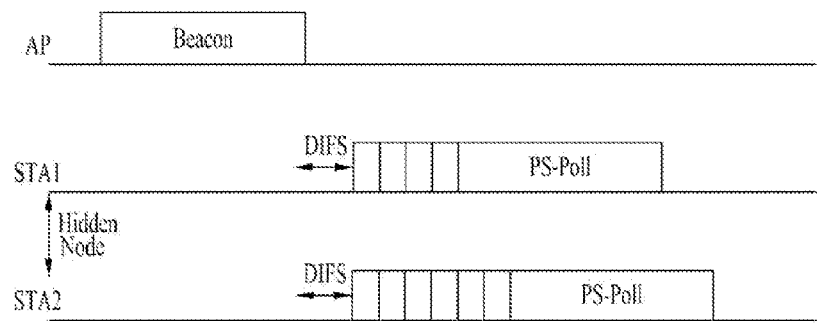
FIG. 16 is a conceptual diagram illustrating a PS-Poll collision in a hidden node environment.

FIG. 16 is a conceptual diagram illustrating a PS-Poll collision in a hidden node environment.

In the example of FIG. 16, it is assumed that the AP has a data frame for STA1 and a data frame for STA2. In addition, it is assumed that each of STA1 and STA2 corresponds to a hidden node, i.e., STA1 is a hidden node of STA2, and STA2 is a hidden node of STA1.

In FIG. 16, through the TIM element of the beacon frame sent from the AP, the presence of buffer DL data may be signaled to STA1 and STA2. Therefore, each of STA1 and STA2 may transmit the PS-Poll frame through contention. In more detail, each of STA1 and STA2 waits for a predetermined time corresponding to DIFS, performs channel sensing while simultaneously waiting for a backoff slot corresponding to an arbitrary backoff counter value (i.e., until the backoff timer expires), and then transmits the PS-Poll frame if the channel is in the idle mode. In FIG. 16, it is assumed that the arbitrary backoff timer value of the STA is set to 4, and the arbitrary backoff timer value of the STA2 is set to 6. In this case, since the backoff timer of STA2 has expired earlier than the STA2, the STA1 may transmit the PS-Poll frame earlier than the STA2. If the PS-Poll frame of STA1 has been successfully applied to the AP, the AP may transmit the buffered data frame for the STA1. In the meantime, since STA2 is a hidden node of STA1, STA1 cannot perform overhearing of the PS-Poll frame applied to the AP. Therefore, it is determined that STA2 is in the idle state while STA1 transmits the PS-Poll frame, so that the STA2 continuously operates its own backoff timer without interruption. As a result, if the backoff timer of STA2 has expired, STA2 may also transmit the PS-Poll frame to the AP. Therefore, as shown in FIG. 16, the PS-Poll frame of STA1 may collide with the PS-Poll frame of STA2.

In order to address the above-mentioned problem shown in FIG. 16, one or more slots are assigned to the STA, and channel access (e.g., PS-Poll Tx/Rx operation) may be performed in some parts of the one or more slots. The one or more slots may correspond to a window (e.g., RAW) to be restrictively accessed by the corresponding STA. In accordance with the present invention, the AP may provide the STA with configuration of one or more slots contained in the RAW. In addition, STA for use in one slot from among one or more slots contained in the RAW may perform the contention-based channel access associated operation using the NDP frame.

For example, in the case of using the one or more slots proposed by the present invention, the length of one slot may be longer than the PS-Poll Tx time (or the length of the PS-Poll frame). Simultaneously with or independently from the above description, the slot may correspond to a channel idle time needed when the STA reduces the backoff timer. In addition, the AP may successfully receive the PS-Poll frame within the length of one slot unit, so that it may transmit a response frame (e.g., ACK frame) in response to the PS-Poll frame. In this case, there is a very high possibility that other STAs corresponding to the hidden nodes can perform overhearing of the above response frame (i.e., a response frame to the PS-Poll frame of the STA) received from the AP, such that it can be recognized that the corresponding channel is being occupied. Accordingly, other STAs cannot reduce their backoff timers, such that they can prevent the occurrence of PS-Poll collision.

Figure 17:
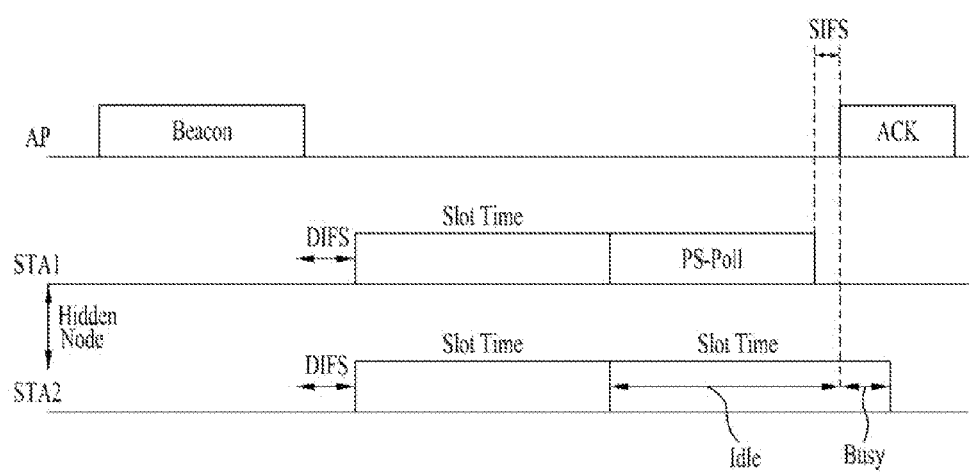
FIG. 17 is a conceptual diagram illustrating a channel access method according to an exemplary embodiment.

FIG. 17 is a conceptual diagram illustrating a channel access method according to an exemplary embodiment.

The channel access method of FIG. 17 may also be represented by the PS-Poll contention scheme under the hidden node situation. In addition, although the slot of FIG. 17 exemplarily corresponds to the backoff slot, the scope or spirit of the present invention is not limited thereto. For example, one time slot of FIG. 17 may correspond to one slot constructing the RAQ allocated to each STA.

In FIG. 17, it is assumed that AP has a data frame for STA1 and a data frame for STA2. In addition, each of STA1 and STA2 may correspond to a hidden node, i.e., STA1 is a hidden node of STA2, and STA2 is a hidden node of STA1.

In FIG. 17, through the TIM element of the beacon frame sent from the AP, the presence of buffer DL data may be signaled to STA1 and STA2. Therefore, each of STA1 and STA2 may transmit the PS-Poll frame through contention. In FIG. 17, assuming that the backoff timer of STA1 is set to 1 and the backoff timer of STA2 is set to 2, STA1 can transmit the PS-Poll frame earlier than STA2. If the PS-Poll frame of the STA1 has been successfully applied to the AP, the AP may transmit the ACK frame to the STA1. Since STA2 is a hidden node of STA1, the STA2 cannot perform overhearing of the PS-Poll frame of the STA1, so that this means that the channel is in the idle state during the front part (i.e., this time corresponds not only to the PS-Poll frame length of STA1 but also to SIFS) of the slot time. However, if the AP transmits the ACK frame after lapse of a short time (e.g., SIFS) upon completion of the PS-Poll transmission by STA1, STA2 can perform overhearing of the ACK frame transmitted from the AP, and this means that STA2 channel; is being occupied. Accordingly, in the slot (or the slot in which the PS-Poll frame has been transmitted) in which STA1 performs channel access, STA2 does not transmit the PS-Poll frame without performing its own backoff timer, resulting in prevention of collision of the PS-Poll frames.

Moreover, the length of a slot proposed by the present invention can be defined by the following equation 1.

$$T_S = T_{PS\text{-}Poll} + \text{SIFS} + T_{CCA\_Response} + 2*PD \qquad [\text{Equation 1}]$$

In Equation 1, $T_s$ may denote a slot time, and $T_{PS\text{-}Poll}$ may denote a transmission time of the PS-Poll frame.

$T_{CCA\_Response}$ may denote a CCA detection time when the AP transmits a response frame to the PS-Poll frame. PD may denote an air propagation delay (APD) value.

In accordance with an additional example of the present invention, a time needed for reception of the response frame may be excluded when the slot time is decided. That is, the slot time ($T_s$) may be decided by the following equation 2.

$$T_S = T_{PS\text{-}Poll} + PD \quad \text{[Equation 2]}$$

If the slot time is established as shown in Equation 2, this means that STA does not expect reception of a response frame to transmission of the PS-Poll frame. Accordingly, power consumption of the STA and a duration time consumed for the contention-based PS-Poll operation can be minimized.

Channel Access Operation Through NDP Frame Transmission by STA

In accordance with an additional example of the present invention, a method for using a new frame including a shortened frame (e.g., PS-Poll frame) used for channel access is proposed to implement more efficient channel access operations. Accordingly, the slot time defined as described above is also reduced so that a duration time consumed for the contention process can also be reduced.

FIG. 18 is a conceptual diagram illustrating an NDP frame format according to an exemplary embodiment.

FIG. 18(a) shows a legacy basic Physical Layer Convergence Protocol (PLCP) Packet Data Unit (PPDU) frame format.

The legacy PPDU frame format may include a Short Training Field (STF), a Long Training Field (LTF), a signal (SIG) field, and a data field. The most basic (for example, non-HT) PPDU frame format may be comprised of a Legacy-STF (L-STF) field, a Legacy-LTF (L-LTF) field, an SIG field, and a data field. In addition, the most basic PPDU frame format may further include additional fields (i.e., STF, LTF, and SIG field) between the SIG field and the data field according to the PPDU frame format types (for example, HT-mixed format PPDU, HT-greenfield format PPDU, a VHT PPDU, and the like).

STF is a signal for signal detection, Automatic Gain Control (AGC), diversity selection, precise time synchronization, etc. LTF is a signal for channel estimation, frequency error estimation, etc. The sum of STF and LTF may be referred to as a PCLP preamble. The PLCP preamble may be referred to as a signal for synchronization and channel estimation of an OFDM physical layer.

The SIG field may include a RATE field, a LENGTH field, etc. The RATE field may include information regarding data modulation and coding rate. The LENGTH field may include information regarding the length of data. Furthermore, the SIG field may include a parity field, a SIG TAIL bit, etc.

The data field may include a service field, a PLCP Service Data Unit (PSDU), and a PPDU TAIL bit. If necessary, the data field may further include a padding bit. Some bits of the SERVICE field may be used to synchronize a descrambler of the receiver. PSDU may correspond to a MAC PDU (Protocol Data Unit) defined in the MAC layer, and may include data generated/used in a higher layer. A PPDU TAIL bit may allow the encoder to return to a state of zero (0). The padding bit may be used to adjust the length of a data field according to a predetermined unit.

FIG. 18(b) exemplarily shows the legacy PS-Poll frame format.

Referring to FIG. 18(b), the legacy PS-Poll frame is defined as the MAC frame format, and may correspond to a control frame according to frame categories. The MAC frame may be basically composed of a MAC header, a frame body, and a Frame Check Sequence. The MAC frame is composed of MAC PDUs, such that it can be transmitted or received through PSDU of a data part of the PPDU frame format of FIG. 18(a).

In the example of FIG. 18(b), the PS-Poll frame format may be comprised of a frame control field, an AID field, a BSSID (RA (Receiving Addressing)) field, a transmitting address (TA), and an FCS field. The frame control field may include control information needed for frame transmission/reception. The AID field may have an AID value allocated to the STA configured to transmit the PS-Poll frame. The BSSID(RA) field may correspond to the AP address, and the TA field may correspond to an address of the STA configured to transmit the frame. In this case, the MAC header may be comprised of the frame control field, the AID field, the BSSID(RA) field, and the TA field. That is, the PS-Poll frame format may be comprised of the MAC header and the FCS only without inclusion of the frame body.

The frame control field may include a protocol version field, a Type field, a Subtype field, a To DS field, a From DS field, a More Fragment (MF) field, a Retry field, a Power Management (PM) field, a More Data (MD) field, a Protected Frame (PF) field, and an Order field.

FIG. 18(c) shows the NDP frame format proposed by the present invention. The NDP frame may represent the frame structure having no data packet. That is, the NDP frame may represent a frame format that includes the initial PLCP preamble part and the SIG field of FIG. 18(a) without inclusion of the remaining parts (i.e., data field). In association with a frame transmitted from the STA to the AP and another frame transmitted from the AP to the STA for channel access, the NDP frame format shown in FIG. 18(c) is used, so that the embodiment of the present invention can reduce a delay time while simultaneously reducing power consumption of the STA.

For example, the STA may use the NDP frame proposed by the present invention, instead of using the PS-Poll frame to be transmitted to the AP. That is, whereas the legacy PS-Poll frame is identical to the MAC control frame that is transmitted through PSDU of the data field, the present invention may use the NDP PS-Poll including no PDSU as necessary. In more detail, as shown in the above-mentioned embodiment, PS-Poll transmission within one slot (i.e., one slot from among RAW) from among one or more slots (e.g., RAW) to be established by the AP for a specific STA is allowed. In this case, the NDP PS-Poll proposed by the present invention may be used as the PS-Poll frame to be transmitted.

In the case in which the NDP frame format is configured as shown in FIG. 18(c), the data field (e.g., MAC control frame of FIG. 18(b)) of FIG. 18(a) is not included in the NDP frame format, so that information corresponding to the frame control field of PSDU (i.e., MAC frame) is not contained therein. However, a minimum amount of control information must be contained in the NDP frame so as to transmit/receive the NDP frame. For this purpose, the present invention provides a method for including the above-mentioned information in the SIG field of FIG. 18(c).

That is, as described above, the NDP frame may include STF, LTF, and SIG field only. In this case, each of STF and LTF may be composed of a channel estimation signal (or sequence) needed for decoding the SIG field. The SIG field may include a plurality of subfields. For example, the SIG field may include a Type subfield, an AID subfield, a BSSID subfield, a Cyclic Redundancy Check (CRC) subfield, etc. In addition, the SIG field may include additional subfields as well as the four subfields, and the order of subfields is only exemplary rather than restrictive.

The Type subfield is used to interpret the SIG field of the NDP frame, and may be set to a specific value indicating the usage of the corresponding NDP frame. For example, if the Type field has a predetermined value, this may indicate that the corresponding NDP frame is an NDP PS-Poll frame. In other words, the SIG field of the NDP frame may be a modified SIG field different from the legacy SIG field (i.e., composed of the RATE field and the LENGTH field, and may indicate whether the corresponding SIG field is a legacy SIG field or a modified SIG field using the Type field acting as a first subfield of the SIG field.

The AID subfield may correspond to the SID of the STA configured to transmit the NDP frame. The AID subfield may be configured to indicate a group ID (or PID) described in FIG. 13. In addition, the AID subfield may correspond to a Partial AID (PAID) defined as an abbreviated form of AID. In addition, the AID subfield may correspond to a predetermined ID value (e.g., a new AID format, or a resultant value obtained by hashing of the legacy AID) for identifying the corresponding STA. The AP having receiving the NDP PS-Poll frame may recognize which STA has been used for transmission of the PS-Poll frame on the basis of AID (or PAID).

In this case, instead of an AID composed of 13 bits, a partial AID (i.e., PAID) composed of 9 bits may be contained in an AID subfield. PAID may be calculated as represented by the following equation 3.

$$(dec(AID[0:8])+dec(BSSID[44:47]\oplus BSSID[40:43])\times 2^5) \mod 2^9 \quad [\text{Equation 3}]$$

In Equation 3, dec(A) is obtained when 'A' is converted into a decimal number, A[b:c] ranges from 'Bit b' to 'Bit c' of the A value when a first bit position of a binary number 'A' is denoted by 'Bit 0'. That is, AID[0:8] may indicate a bitstream composed of 9 bits ranging from the 0-th position to the $8^{th}$ position from among the AID bitstream of 13 bits. 'mod' may indicate a modulo operation. "X mod Y" is the remainder when X is divided by Y. $\oplus$ may indicate a bitwise XOR (exclusive OR) operation. For example, 1 XOR 1=0, 0 XOR 1=1, 1 XOR 0=1, and 0 XOR 0=0 can be calculated.

Next, the BSSID subfield may correspond to a BSSID of the AP including the STA having transmitted the NDP frame. In addition, the BSSID subfield may correspond to a Partial BSSID (PBSSID) defined as an abbreviated format of the BSSID. In addition, the BSSID subfield may correspond to a predetermined ID value (e.g., a new AID format, or a resultant value obtained by hashing of the legacy AID) for identifying the corresponding AP. The BSSID subfield may indicate a reception address (RA) of the NDP frame.

The CRC subfield may be used to detect errors of the SIG field of the NDP frame.

A method for enabling the STA to transmit the NDP PS-Poll frame using the above-mentioned NDP frame according to the present invention will hereinafter be described in detail.

STA may transmit the NDP PS-Poll frame at one of a plurality of slots allowed in a manner that the STA can perform channel access. The AP having received the NDP PS-Poll frame may decide whether to answer the NDP PS-Poll frame through the BSSID (or PBSSID) subfield of the SIG field. As a response to the NDP PS-Poll frame, the AP may transmit the ACK frame, or may transmit the buffered data frame for the corresponding STA.

The case in which the AP transmits the ACK frame, although the buffered data for the corresponding STA is present or absent, may have difficulty in immediately transmitting the data frame after lapse of SIFS upon reception of the NDP PS-Poll frame. If the buffered data for the STA is not present, the More Data (MD) bit of the frame control field of the ACK frame transmitted from the AP to the STA may be set to zero 0. Alternatively, in the case in which the buffered data for STA is present and the ACK frame is transmitted, the MD bit may be set to 1.

FIG. 18(d) shows an NDP-type ACK frame proposed by the embodiment.

In order to reduce overhead of the ACK frame when the AP transmits the ACK frame, the embodiment proposes a method for defining and using a modified ACK frame. Whereas the legacy ACK frame is a MAC control frame transmitted on a PSDU (See the DATA field of FIG. 18(a)), the ACK frame proposed by the embodiment may be comprised of an NDP frame shown in FIG. 18(d).

In more detail, the NDP ACK frame is comprised of only STF, LTF and SIG fields. Each of the STF and LTE fields may be comprised of a channel estimation sequence for decoding the SIG field. The SIG field may include at least one of four subfields to be described later. The scope or spirit of the present invention is not limited thereto, and an additional subfield may be contained in the SIG field.

The Type subfield may interpret the SIG field of the NDP frame, and may have a specific value for indicating a usage of the corresponding NDP frame. For example, if the Type field has a predetermined value, this means that the corresponding NDP frame is an NDP ACK frame. In other words, the SIG field of the NDP frame may be a modified SIG field different from the legacy SIG field (composed of a RATE field and a LENGTH field). The SIG field of the NDP field may indicate whether the corresponding SIG field is a legacy SIG field or a modified SIG field using the Type field acting as a first subfield of the SIG field.

The ACK ID subfield may indicate a target STA of the NDP ACK frame. For example, if the NDP ACK frame is transmitted as a response to the NDP PS-Poll frame, the ACK ID subfield may be configured to indicate the STA to be used as a receiver of the ND PACK frame. The ACK ID field may be comprised of a combination of an AID (or PAID) subfield contained in the NDP PS-Poll frame (e.g., See FIG. 18(c)) and a BSSID (or a partial BSSID) subfield. If AID of the NDP PS-Poll frame is assigned a PAID value, the ACK ID of the ND PACK frame is assigned a value based on PAID.

In case of a More Data (MD) bit subfield, if data buffered for STA is not present in the AP, the MD bit is set to 0. If data buffered for STA is present in the AP, the MD bit is set to 1.

A CRC subfield may be used to detect an error of the SIG field of the NDP ACK frame.

Improved Channel Sensing Operation

According to the slot based channel access operation (See FIG. 17) proposed by the present invention, if the channel is in an idle state during the slot time, STA sequentially reduces the backoff timer. If the backoff timer has expired, the STA may perform the channel access operation (e.g., transmission of PS-Poll or NDP PS-Poll frame). In this case, the operation for continuously performing channel sensing during the entire slot time may increase power consumption of the STA. Therefore, the present invention proposes a method for allowing the STA to perform channel sensing only in some parts of the slot time.

For example, if the channel sensing is performed only in some parts of the initial part or the last part of one slot unit, it can be determined whether the channel is an occupied state or an idle state during the entire time of the corresponding single slot unit. That is, the channel sensing time (or CCA detection time) may be set to some parts of the initial or last part of one slot unit. In other words, the operation for performing channel sensing by the STA may be set to a slot boundary.

Figure 19:
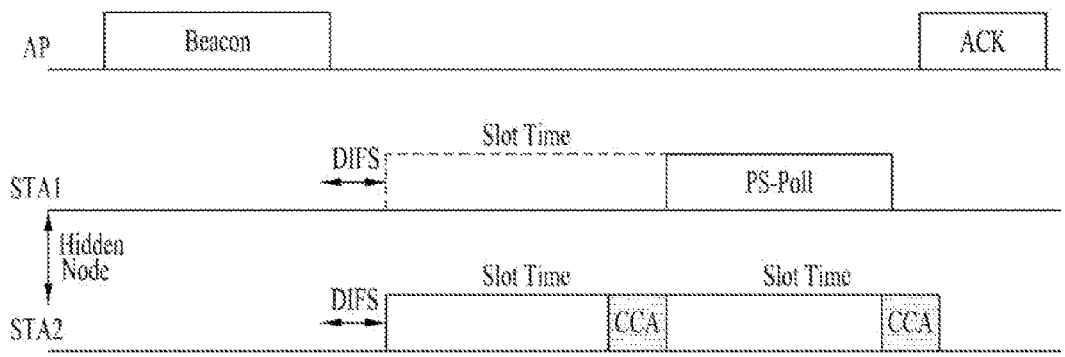
FIG. 19 is a conceptual diagram illustrating a channel sensing operation according to an exemplary embodiment.

FIG. 19 is a conceptual diagram illustrating a channel sensing operation according to an exemplary embodiment.

The example of FIG. 19 may assume the same situation as in FIG. 17. That is, each of STA1 and STA1 may recognize the presence of its own data on the basis of the TIM element of the beacon frame of the AP, each of STA1 and STA2 may correspond to a hidden node (i.e., STA1 is a hidden node of STA2, and STA2 is a hidden node of STA1). After lapse of a first slot after the STA1 backoff timer has firstly expired, the PS-Poll (or NDP PS-Poll) can be transmitted.

In this case, STA2 may perform channel sensing (e.g., CCA) only in some parts of the last part of the slot time, determine whether the channel is occupied or idle in units of a slot time, and thus determine whether the backoff timer will be operated.

In more detail, STA2 performs CCA at the last part of the first slot and decides an idle channel state, so that it starts the backoff timer. Thereafter, although STA2 does not perform CCS during a transmission period (or most of the transmission period) of the PS-Poll (or NDP PS-Poll) frame sent from STA1 at the second slot, the STA2 may perform CCA at some of the last art of the second slot. That is, if STA1 is a hidden node of STA2, although STA2 continuously performs CCA in the entire one slot unit, it is impossible to perform overhearing of the PS-Poll (or NDP PS-Poll) frame of the STA1 in such a manner that unnecessary CCA is prevented from operating, resulting in reduction of STA2 power consumption. In addition, under the condition that STA1 cannot perform overhearing, STA1 may transmit a PS-Poll (or NDP PS-Poll) frame, and the ACK frame of the AP configured to answer the PS-Poll frame can be detected through CCA by STA2, such that it can be recognized that STA1 occupies this channel at the corresponding slot. If STA1 does not transmit the PS-Poll (or NDP PS-Poll) frame, there is no response (i.e., the ACK or data frame) of the AP. Therefore, from the viewpoint of STA2, although the STA1 performs CCA only at some parts of the last portion of one slot, it is possible to correctly determine whether a current state at the corresponding slot is an occupied state or an idle state.

Channel Access Operation Through NDP Frame Transmission of AP

The above-mentioned examples have disclosed the channel access method using the NDP frame (or NDP PS-Poll frame) to be transferred from the STA to the AP. In addition, the present invention provides the channel access operation using the NDP frame to be transferred from the AP to the STA.

For example, if the buffered data (e.g., bufferable unit (BU)) to be transferred from the AP to the STA is present, the NDP frame that informs the STA of the presence of buffered data may be transmitted. In other words, the AP may actively perform polling to transmit the buffered frame to the STA, and this operation may be regarded as the PS-Poll frame to be transmitted by the AP. However, the scope or spirit of the present invention is not limited by the above names only, and the PS-Poll frame from the AP according to the present invention may indicate the NDP frame that is transferred from the AP to the STA to inform the STA of the presence of BU.

The NDP PS-Poll frame from the SP may include an identifier (e.g., AID or PAID) of the target STA to which the corresponding frame is transmitted. In addition, specific information indicating the presence of buffered data (e.g., BU) may also be included in the NDP PS-Poll frame. The scope or spirit of the present invention is not limited thereto, and additional information may also be included in the above exemplary information.

If STA indicating a destination of the NDP PS-Poll frame starting from the AP is in the awake state, STA having received the NDP PS-Poll frame may transmit the ACK frame in response to the NDP PS-Poll frame to the AP, so that the STA may inform the AP that the STA has already been awakened. Subsequently, the AP may immediately transmit the buffered frame to the corresponding STA (i.e., STA configured to answer the PS-Poll frame received from the AP).

In the meantime, if STA acting as a destination of the NDP PS-Poll frame from the AP is a sleep state, the corresponding STA may not answer the NDP PS-Poll frame. The AP, that has not received a response to the NDP PS-Poll frame starting from the AP from the STA, may transmit the NDP PS-Poll frame to another STA.

Figure 20:
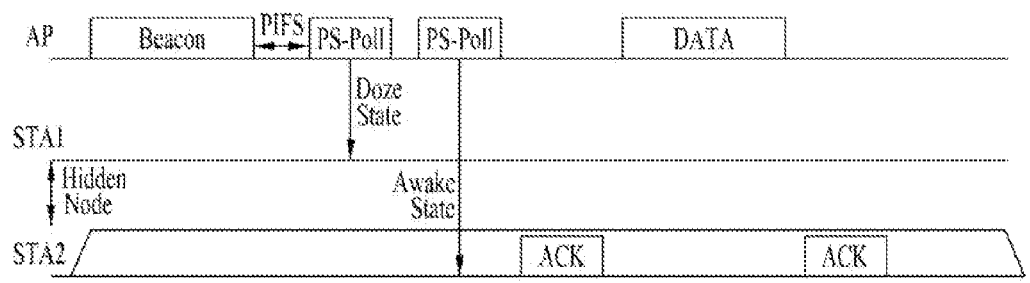
FIG. 20 is a conceptual diagram illustrating a channel access method using an NDP PS-Poll frame from an access point (AP).

FIG. 20 is a conceptual diagram illustrating a channel access method using an NDP PS-Poll frame from an access point (AP).

In FIG. 20, STA1 and STA2 are hidden nodes (i.e., STA1 is a hidden node of STA2, and STA2 is a hidden node of STA1), and it is assumed that data (or BU) to be transmitted from AP to each STA is present. For example, while the AP transmits the NDP PS-Poll frame to STA1, because STA1 is a sleep state, the STA1 cannot generate a response to the NDP PS-Poll frame. The AP having not received a response from STA1 may transmit the NDP PS-Poll frame to the STA2.

STA2 in an awake state may receive the NDP PS-Poll frame from the AP, so that the STA2 may start the channel access operation. For example, the STA2 may receive data from the AP through contention. As shown in FIG. 20, STA2 may generate the ACK frame corresponding to a response to the NDP PS-Poll frame from the AP, so that the STA2 may transmit the ACK frame to the AP. The AP having detected that STA2 is capable of receiving the BU may transmit the BU (i.e., buffered data) to the STA2. After STA2 successfully receives the data frame from the AP, the STA2 may transmit a response frame (e.g., ACK frame) to the AP.

In the example of FIG. 20, a specific time point at which the AP transmits the NDP PS-Poll frame to the STA may be a specific time at which the STA should be awaken. Alternatively, when at least one slot (e.g., RAW) is allocated by each AP of STA1 and STA2, the PS-Poll frame from the AP may be transmitted on a slot unit (or at a slot boundary) in a similar way to the operation in which STA performs channel sensing on a slot basis (or at a slot boundary) or transmits the PS-Poll frame on a slot basis (or at a slot boundary). In addition, the NDP PS-Poll frame from the AP may be transmitted to the STA when a current channel of the AP is in an idle state.

Slot Based Trigger Frame

The above-mentioned examples have exemplarily disclosed methods for using the PS-Poll frame composed of the NDP frame when STA transmits the PS-Poll frame to the AP. A method for allowing the STA to request data transmission from the AP using the trigger frame according to the embodiment will hereinafter be described in detail.

STA may recognize the presence or absence of a buffered frame to be received by STA through the TIM element contained in the beacon frame. In order to receive the buffered frame by the STA, the PS-Poll frame may be transmitted to the AP, or a service period (SP) initiated through transmission of the trigger frame may be used. If STA supports the scheduled or unscheduled APSD, the operation for allowing the STA to transmit the trigger frame, instead of the PS-Poll frame, to the AP may be considered more effective.

In the meantime, when a plurality of STAs simultaneously transmits the trigger frames to the AP, trigger frames of the STAs corresponding to the hidden nodes may collide with each other. In order to solve the above-mentioned problem, in a similar way to the slot based channel access scheme for use in the PS-Poll frame transmission of FIG. 17, a method for allocating one or more slots (e.g., RAW) to the STA and transmitting the trigger frame at one of the slots may be used.

In this case, the length of one slot unit may be longer than the transmission time of the trigger frame. In addition, one slot time may also correspond to a channel idle time unit needed for reducing the backoff timer during the contention process. In this case, if the AP successfully receives the trigger frame and transmits a response frame to the trigger frame, although other STAs corresponding to the hidden nodes cannot perform overhearing, the other STAs can perform overhearing of the response frame sent from the AP, so that they can recognize the occupied state of the channel. Therefore, the backoff timer may not start operation during the above slot time.

Figure 21:
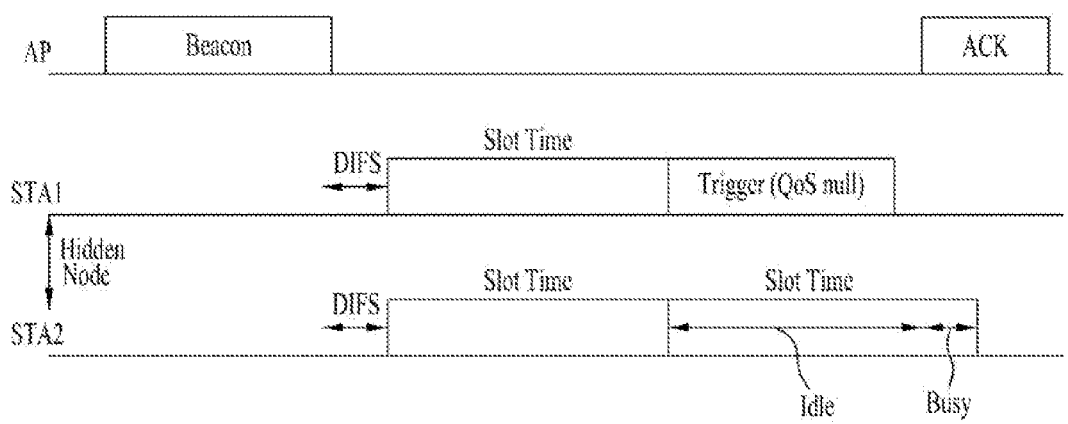
FIG. 21 is a conceptual diagram illustrating a trigger frame competition method according to an exemplary embodiment.

FIG. 21 is a conceptual diagram illustrating a trigger frame competition method according to an exemplary embodiment.

Referring to FIG. 21, AP has a data frame for STA1 and STA2, and may inform STA1 and STA2 of the presence of data frame through the TIM element of the beacon frame. STA1 and STA2 may correspond to the hidden nodes, and may attempt to perform channel access based on contention. In addition, if the backoff timer of STA1 is set to 1 and the backoff timer of STA2 is set to 2, STA1 may first transmit the trigger frame. If the trigger frame from STA1 is successfully applied to the AP, the AP may transmit the ACK frame for STA1. In the meantime, since STA2 is a hidden node, the STA2 cannot perform overhearing of the trigger frame sent from STA1 and can determine that the channel is an idle state. However, STA2 can receive the ACK frame from the AP, such that the STA2 can determine the occupied state of the channel. Accordingly, from the viewpoint of the STA2, since the backoff timer of the STA2 does not operate during a specific time in which STA1 occupies the channel, the trigger frame is not transmitted at the next slot, so that the occurrence of collision between the trigger frames may be prevented.

To support the trigger frame contention mechanism, the slot time may be represented by the following equation 4.

$$T_S = T_{Trigger} + \text{SIFS} + T_{CCA\_Response} + 2*\text{PD} \qquad [\text{Equation 4}]$$

In equation 4, $T_s$ is a slot time. $T_{Trigger}$ is a transmission time of the trigger frame. $T_{CCA\_Response}$ is a CCA detection time when the AP transmits a response frame to the trigger frame. PD is an air propagation delay (APD) value.

In another example of the present invention, a predetermined time needed for receiving the response frame when the slot time is decided may be excluded. That is, the slot time ($T_s$) may be decided by the following equation 5.

$$T_S = T_{PS\text{-}Poll} + \text{PD} \qquad [\text{Equation 5}]$$

The case in which the slot time is established as shown in Equation 5 may be considered an exemplary case in which the STA transmits the trigger frame and then does not receive a response frame to the trigger frame. Therefore, STA power consumption and a time consumed for the contention based trigger operation can be minimized.

Moreover, although the present invention can solve the hidden node problem through the slot based trigger frame transmission operation as described above, STA power consumption and a duration time needed for contention may unavoidably increase when a long slot time is established. Accordingly, the present invention proposes a method for further reducing the transmission time of the trigger frame.

Figure 22:
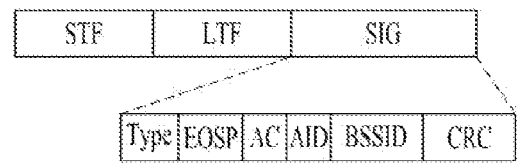
FIG. 22 is a conceptual diagram illustrating an NDP trigger frame according to an exemplary embodiment.

FIG. 22 is a conceptual diagram illustrating an NDP trigger frame according to an exemplary embodiment.

Referring to FIG. 22, although the legacy trigger frame is defined as MAC frame to be transmitted in PSDU of the data part of the PPDU frame, the present invention proposes the trigger frame format having no PDSU (i.e., NDP form). The NDP trigger frame may include the STF, the LTF, and the SIG field only. Each of STF and LTF may be composed of a channel estimation sequence needed for decoding the SIG field.

The SIG field may include the following 6 subfields. However, the scope or spirit of the present invention is not limited thereto, and additional subfields may also be defined.

The Type subfield may be used to perform SIG interpretation of the NDP frame, and may indicate that the corresponding NDP frame is a trigger frame.

The End Of Service Period (EOSP) subfield may indicate whether the trigger frame indicates the start or end of SP.

The Access Category (AC) subfield may indicate access category information of the triggered SP.

The AID subfield may correspond to an SID of the STA configured to transmit the NDP trigger frame. The AID subfield may be configured to indicate a partial AID (PAID), a group ID, or the like. In addition, the AID subfield may correspond to a predetermined ID value (e.g., a new AID format, or a resultant value obtained by hashing of the legacy AID) for identifying the corresponding STA. The AP having receiving the NDP trigger frame may recognize which STA has been used for transmission of the trigger frame on the basis of AID (or PAID). PAID, for example, may be defined as described in the equation 3.

The BSSID subfield may correspond to a BSSID of the AP including the STA having transmitted the NDP trigger frame. In addition, the BSSID subfield may correspond to a Partial BSSID (PBSSID) defined as an abbreviated format of the BSSID. In addition, the BSSID subfield may correspond to a predetermined ID value (e.g., a new AID format, or a resultant value obtained by hashing of the legacy AID) for identifying the corresponding AP.

The CRC subfield may be used to detect errors of the SIG field of the NDP trigger frame.

A method for enabling the STA to transmit the NDP trigger frame using the above-mentioned NDP frame according to the present invention will hereinafter be described in detail.

STA may transmit the NDP trigger frame at one of a plurality of slots allowed in a manner that the STA can perform channel access. The AP having received the NDP trigger frame may decide whether to answer the NDP trigger frame through the BSSID (or PBSSID) subfield of the SIG field. As a response to the NDP PS-Poll frame, the AP may transmit the ACK frame, or may transmit the buffered data frame for the corresponding STA.

The case in which the AP transmits the ACK frame, although the buffered data for the corresponding STA is present or absent, may have difficulty in immediately transmitting the data frame after lapse of SIFS upon reception of the NDP trigger frame. If the buffered data for the STA is not present, the More Data (MD) bit of the frame control field of the ACK frame transmitted from the AP to the STA may be set to zero 0. Alternatively, in the case in which the buffered data for STA is present and the ACK frame is transmitted, the MD bit may be set to 1.

In order to further reduce STA power consumption, the STA may be configured to transmit the trigger frame at a predetermined time.

In addition, when using the NDP trigger frame, since the NDP frame is constructed using the lowest modulation and coding scheme (MCS), it is expected that a block error rate (BER) is at a low level.

Additional Example for Employing the NDP Type Frame

The above-mentioned embodiments have disclosed the operations for employing the NDP-type frame (e.g., NDP PS-Poll frame, NDP trigger frame, etc.) transferred from STA to AP and the NDP-type frame (e.g., NDP PS-Poll frame) transferred from AP to STA. The following description will disclose not only additional examples for employing the NDP-type frame transferred from STA to AP, but also additional examples for employing the NDP-type frame transferred from AP to STA.

Additional Example for Transmitting the NDP PS-Poll Frame from STA to AP

The operation related to the NDP PS-Poll frame transferred from STA to AP has already been disclosed with reference to FIG. 19. In this case, the NDP type frame that is transmitted from STA to the AP may include a partial BSSID field shown in FIG. 18(c).

The AP that receives the NDP PS-Poll frame from the STA may determine whether to answer the NDP PS-Poll frame. In this case, the partial BSSID may be composed of some bits of BSSID (or may also be composed of values obtained when the hashing function is applied to the BSSID value). Respective partial BSSIDs of different BSSID values may be identical to each other. Therefore, if a plurality of APs corresponding to the same partial BSSID is present, a plurality of APs may answer the NDP PS-Poll frame of the STA.

For example, it is assumed that two APs (e.g., AP1 and AP2) having the same partial BSSID value are adjacent to each other, STA1 is associated with AP1, and STA2 is associated with AP2. If STA1 and STA2 have the same AID, AP2 may mistake the NDP PS-Poll frame transferred from STA1 for an NDP PS-Poll frame transferred from STA2. In this case, if data for STA2 is buffered in AP2, AP2 may attempt to transmit the buffered frame to STA2. In this case, if the STA is in a doze state, the corresponding buffered frame may be retransmitted and discarded.

Therefore, in order to prevent the aforementioned malfunction or the waste of resources, when AP receives the NDP PS-Poll frame from STA, although the partial BSSID value contained in the NDP PS-Poll frame is identical to that of the AP, the fact that the corresponding PS-Poll frame may actually be transmitted from STA belonging to other BSSs to AP of the other BSSs needs to be considered in operation. For this purpose, the following schemes are proposed.

In accordance with the first scheme, after AP has received the NDP PS-Poll frame, the AP may transmit only the ACK frame acting as a response frame to the NDP PS-Poll frame. Generally, if AP receives the PS-Poll frame or the NDP PS-Poll frame from the STA, and if the prepared data is present, a data frame is immediately transmitted. If it is expected that a time delay for preparing the data frame occurs, the AP may transmit the ACK frame. However, in accordance with the proposal of the present invention, the AP having received the NDP PS-Poll frame from the STA does not immediately transmit the buffered data frame although the prepared data exists, only the operation for transmitting the ACK frame is allowed. That is, if the AP receives the NDP PS-Poll frame, the fact that the buffered frame exists is signaled to the STA through the ACK frame, transmission of the buffered frame will not be immediately carried out.

In accordance with the second scheme, in order to allow the STA having received the ACK frame answering the NDP PS-Poll frame to receive the buffered frame from the AP, the STA may transmit a trigger frame so that a service period (SP) may be initiated. In this case, the trigger frame is a normal trigger frame including a BSSID field (i.e., a full BSSID value) that is 48 bits long.

In accordance with the third scheme, before the AP having transmitted the ACK frame related to the NDP PS-Poll frame from a STA transmits the buffered frame to the STA, RTS/CTS frame exchange is certainly carried out, so that it may be reconfirmed whether a target STA that desires to transmit the buffered frame is a STA having transmitted the NDP PS-Poll frame.

In accordance with the fourth scheme, the buffered frame transmitted from the AP upon receiving the NDP PS-Poll frame from the STA may not be retransmitted although a data transmission failure occurs. Therefore, although the data transmission failure occurs, the frame buffered in AP is continuously stored in the buffer, and may be transmitted when STA retransmits the PS-Poll frame.

In accordance with the fifth scheme, the buffered frame transmitted from the AP upon receiving the NDP PS-Poll frame from the STA is retransmitted when transmission failure occurs. Although the number of retransmission times reaches a retry limit, the corresponding buffered frame may not be discarded. Therefore, after the number of retransmission times reaches the retry limit, the buffered frame is continuously stored in the buffer, and the buffered frame may be transmitted only when STA retransmits the PS-Poll frame.

In accordance with the sixth scheme, if the STA detects information for indicating the presence of a plurality of APs having the same partial BSSID, the corresponding STA may not use the NDP PS-Poll frame.

In another example of the above-mentioned operation in which the NDP PS-Poll frame is transmitted from STA to AP, the present invention proposes a method for defining and using the modified NDP PS-Poll frame.

Figure 23:
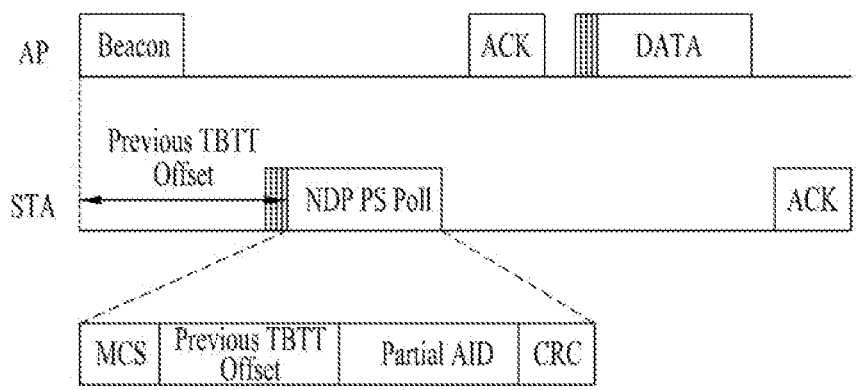
FIG. 23 is a conceptual diagram illustrating the operation of using a modified NDP PS-Poll frame transferred by STA according to an exemplary embodiment.

FIG. 23 is a conceptual diagram illustrating the operation of using a modified NDP PS-Poll frame transferred by STA according to an exemplary embodiment.

Referring to FIG. 23, in the case of fields contained in the NDP PS-Poll frame transmitted from STA to AP, a "previous TBTT (Target Beacon Transmission Time) offset" field is additionally contained in a partial BSSID field, instead of the partial BSSID shown in FIG. 18(c).

The "previous TBTT (Target Beacon Transmission Time) offset" may indicate a difference (i.e., an offset value) between a first time at which STA transmits the NDP PS-Poll offset and a second time (or a beacon frame transmission time of AP) at which STA receives the last beacon frame before the STA transmits the NDP PS-Poll frame.

For example, at the transmission time T2, AP transmits a beacon frame at the transmission time T1, STA recognizes the presence of a buffered frame to be received through a TIM information element contained in the corresponding beacon frame, and receives the corresponding buffered frame, and the NDP PS-Poll frame is transmitted to the AP. In this case, the modified "previous TBTT (Target Beacon Transmission Time) offset" value may be set to a difference (i.e., T2−T1) between a first time at which STA receives a beacon and a second time at which STA transmits the NDP PS-Poll frame.

Referring to FIG. 23, after STA receives the beacon from AP, STA may transmit the NDP PS-Poll frame through a backoff process. In this case, the previous TBTT offset field may be contained in the NDP PS-Poll frame. An AP having received the NDP PS-Poll frame may determine whether the beacon that triggers the corresponding NDP PS-Poll frame through the previous TBTT offset value is a beacon having been transferred from the AP. That is, from the viewpoint of AP, if a difference between a first time at which AP transmits a beacon and a second time at which STA receives the NDP PS-Poll frame is identical to the previous TBTT offset value contained in the NDP PS-Poll frame transferred from STA, it may be determined that STA has transmitted the NDP PS-Poll frame on the basis of the beacon frame transferred from the AP. Accordingly, the AP may transmit the ACK frame or the data frame to the corresponding STA. If a difference between a first time at which the AP transmits the beacon and a second time at which the AP receives the NDP PS-Poll frame from STA is different from a previous TBTT offset value contained in the NDP PS-Poll frame received from STA, AP may not transmit any frame in response to the NDP PS-Poll frame from STA.

In this case, since only one AP is specified by the previous TBTT offset value, obscurity in the operation for deciding whether AP will answer the NDP PS-Poll frame may be removed by the above-mentioned partial BSSID value. In more detail, if different APs simultaneously transmit the beacon frame under the Overlapping BSS (OBSS) environment in which different BSS coverages are overlapped, collision may occur in the different APs, so that STA may not receive any beacon frame. In addition, it may be assumed that there is only one AP that enables the STA to receive the beacon under an environment but not the OBSS environment. Therefore, the operation for enabling the STA to receive the beacon frame may indicate that there is only one AP that has transmitted the beacon at the corresponding time within the STA reception range. Therefore, if the previous TBTT offset value is contained in the NDP PS-Poll frame, only one AP is specified, and may receive a response frame (e.g., ACK frame or DATA frame) from the corresponding AP only.

Additional Example of the Operation for Transmitting the NDP PS-Poll Frame from AP to STA The operation related to the NDP PS-Poll frame transferred from AP to STA has already been disclosed with reference to FIG. 20. In this case, the NDP-type frame transferred from AP to STA may include a partial BSSID field as shown in FIG. 18(c).

As described above, the modified NDP PS-Poll frame (i.e., the NDP PS-Poll frame additionally including the previous TBTT offset field instead of the partial BSSID) illustrated in the additional examples of the above-mentioned operation for allowing the STA to transmit the NDP PS-Poll frame may be similarly applied to the NDP PS-Poll frame transferred from AP to STA. In this case, through the previous TBTT offset value contained in the NDP PS-Poll frame transferred from AP, it can be determined which AP has been transmitted the NDP PS-Poll frame by STA.

Figure 24:
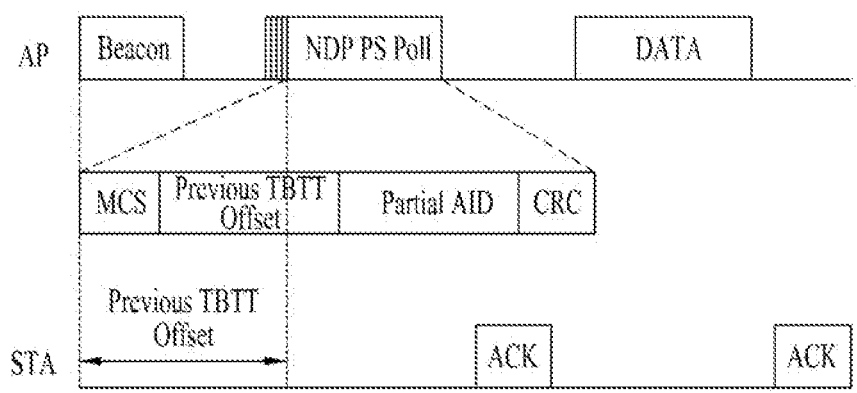
FIG. 24 is a conceptual diagram illustrating the operation of using a modified NDP PS-Poll frame transferred from AP according to an exemplary embodiment.

FIG. 24 is a conceptual diagram illustrating the operation of using a modified NDP PS-Poll frame transferred from AP according to an exemplary embodiment.

FIG. 24 assumes the case in which AP transmits the beacon frame, and subsequently transmits the NDP PS-Poll frame to the STA through a backoff process. In this case, the AP may set a difference between one transmission time of the beacon frame having been transmitted and the other transmission time of the NDP PS-Poll frame to a previous TBTT offset field value, and may include the set difference in the NDP PS-Poll frame.

STAs belonging to the same BSS as in AP recognize the beacon reception time, so that the STA having received the NDP PS-Poll frame from AP may calculate a difference between a reception time of the previous beacon and a reception time of the newly received NDP PS-Poll frame. If the difference value is identical to the previous TBTT offset field value contained in the received NDP PS-Poll frame, STA may decide that the AP of BSS including the STA is an NDP PS-Poll frame transferred from the AP.

Although the principles of the operations proposed by the present invention have been disclosed using the PS-Poll contention-free mechanism as an example, the scope or spirit of the present invention is not limited thereto. That is, the principles of the present invention can be applied not only to the PS-Poll contention-free mechanism but also to other mechanisms in which the NDP-type control frame is used as a polling frame. In more detail, if it is difficult to definitely specify AP or BSS in a frame not including a full BSSID field of 48 bits, the offset field based on a previous specific frame is used, so that obscurity in specifying the AP or BSS can be removed.

For example, an offset value based on a previous specific frame proposed by the present invention may be used in the NDP sounding process.

Figure 25:
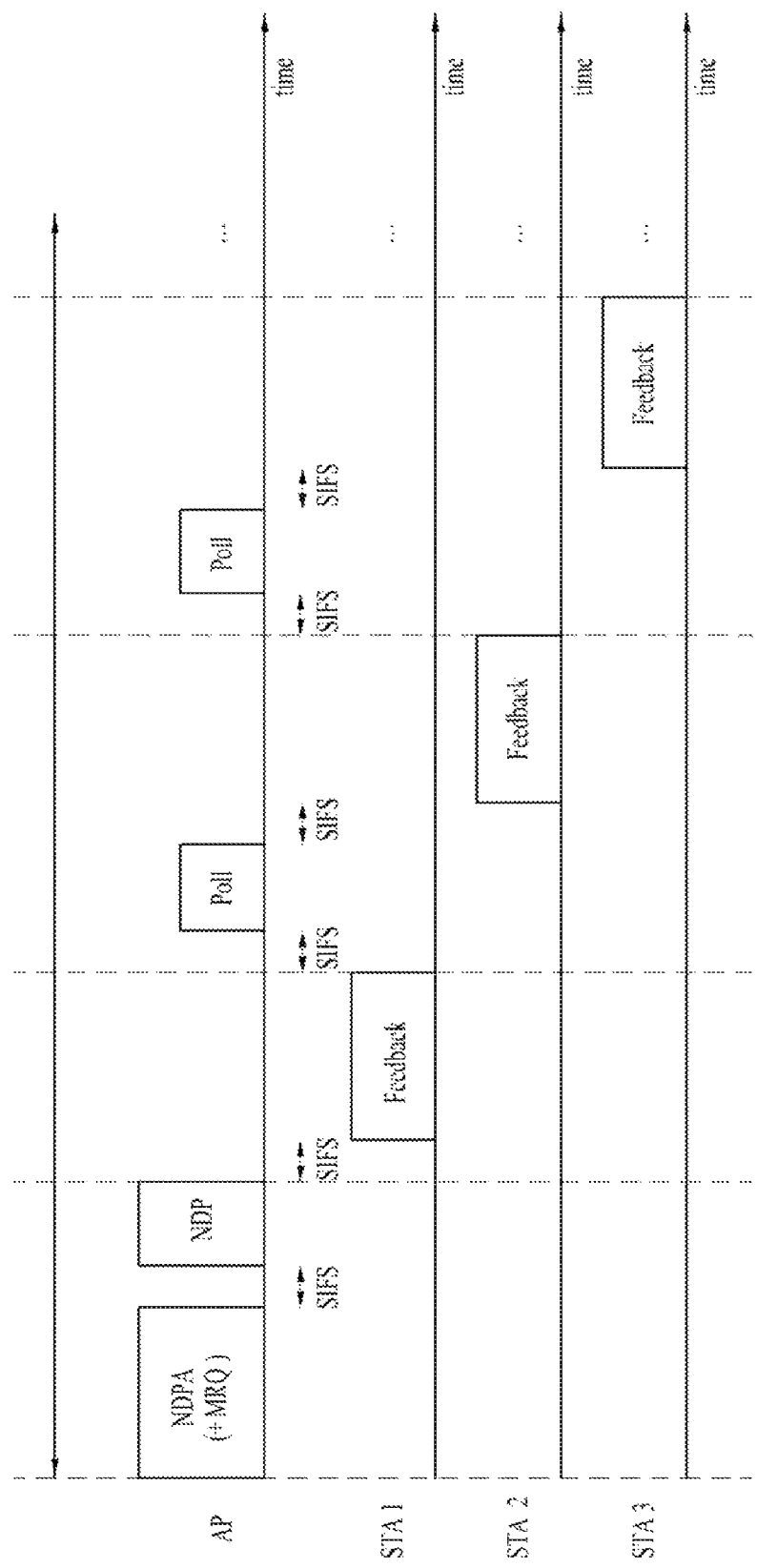
FIG. 25 is a conceptual diagram illustrating an NDP sounding process.

FIG. 25 is a conceptual diagram illustrating an NDP sounding process.

The sounding protocol can obtain feedback information of Channel State Information (CSI) between AP and STA from the STA so that the AP performs beamforming transmission to the STA. The beamforming transmission may indicate the transmission scheme for controlling a beam direction of each STA, and may be used for multi-user (MU)-MIMO transmission. In addition, CSI may include Modulation and Coding Scheme (MCS) or the like, suitable for the corresponding channel.

Through the sounding process, AP may transmit the NDP frame (i.e., PPDU frame having a PSDU length of 0) to the STA, and STA may calculate/estimate the CSI on the basis of the NDP frame and may transmit the CSI calculation/ estimation result (i.e., feedback information) to the AP. The CSI calculated/estimated through the NDP frame may be fed back to the AP requesting sounding through a compressed beamforming report frame. In addition, the NDP frame having been transmitted from AP may be received by a plurality of STAs, and AP may obtain feedback information from each STA.

Prior to transmission of the NDP from the AP, an NDP Announcement (NDPA) may be transmitted. The NDPA frame may be a PPDU frame for indicating that the NDP frame will be continued. A first STA of the STA list contained in the NDPA frame may immediately transmit a feedback frame to the AP without receiving additional polling from AP.

The NDPA frame is a control frame (i.e., a High Throughput Control (HTC) frame) in which the NDP announcement subfield is set to 1. In addition, the NDPA frame should be transmitted in a manner that all target STAs of the sounding process can receive the NDPA frame. Therefore, beamforming need not be applied to transmission of the NDPA frame (i.e., the NDPA frame must be omnidirectionally transmitted).

Referring to FIG. 25, the AP may transmit the NDPA frame, and may transmit the NDP frame after lapse of an SIFS interval. The MCS ReQuest (MRQ) subfield may be contained in the NDPA frame. If the MRQ subfield of the NDPA frame transmitted from AP is set to 1, STA having received the NDPA frame can recognize that AP is requesting MCS feedback.

A first STA (e.g., STA1) of the STA list contained in NDPA may receive the NDP frame from the AP, and may transmit feedback information to the AP after lapse of the SIFS interval. AP receives the feedback information from STA1, and transmits the Poll frame to STA2 after lapse of the SIFS interval. STA2 having received the Poll frame from AP may transmit the feedback information to the AP after lapse of the SIFS interval. Thereafter, STAs polled by AP may sequentially transmit feedback information to the AP.

As can be seen from FIG. 25, the NDP and Poll frames transmitted from STA (i.e., AP) that requests feedback in the sounding process can trigger the feedback frame from the target STAs (i.e., STA1, STA2, STA3) of the sounding process, so that the NDP frame and the Poll frame may be generically called a feedback trigger frame.

If a full BSSID value of 48 bits is not contained in the NDP frame (or Poll frame) subsequent to the NDPA, STA may indefinitely specify the AP configured to transmit the NDP frame (or Poll frame).

In this case, according to the embodiments, the previous TBTT offset field contained in the NDP-type frame may also be contained in the NDP frame (or Poll frame) transmitted by AP during the NDP sounding process. Therefore, the STA may determine whether the AP having transmitted the beacon frame is identical to the AP having transmitted the NDP frame (or Poll frame) on the basis of the beacon frame transmission time.

As described above, several STAs can commonly receive the NDPA frame, and the reception time of the NDPA frame may be known to STAs. Therefore, the previous NDPA offset field, instead of the previous TBTT offset, may be defined and used in the NDP frame (or Poll frame) transmitted in the NDP process.

Figure 26:
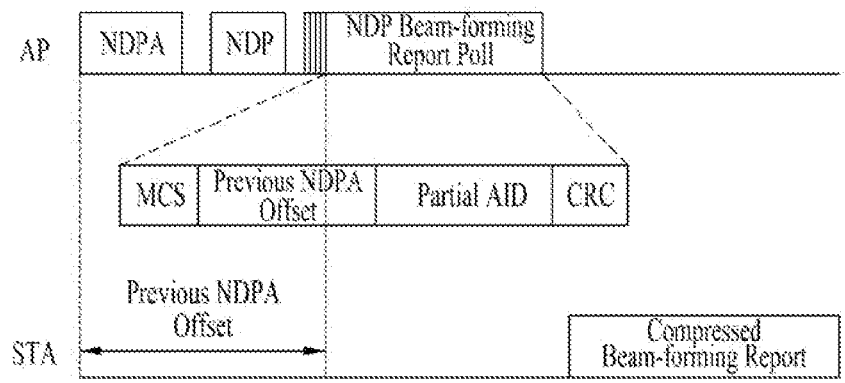
FIG. 26 is a conceptual diagram illustrating an NDP sounding process according to an exemplary embodiment.

FIG. 26 is a conceptual diagram illustrating an NDP sounding process according to an exemplary embodiment.

If AP transmits the NDPA frame and the NDP frame, STAs indicated by target STAs of the sounding in the NDPA frame may memory the reception time of the NDPA frame. Subsequently, CSI may be calculated using the NDP frame transmitted from AP, and may stay in a standby mode until the AP transmits the NDP beamforming report Poll frame.

When the AP transmits the NDPA frame to STAs and subsequently transmits the NDP frame and the Poll frame (in more detail, the NDP beamforming report Poll frame) to each STA, the previous NDPA offset field may be additionally contained in the NDP frame (or Poll frame) instead of the partial BSSID field.

STA may determine whether the previous NDPA offset value contained in the NDP frame (or Poll frame) is identical to a difference between a first time at which STA receives the NDPA frame and a second time at which STA receives the NDP frame (or Poll frame). If the previous NDPA offset value is identical to the difference, the STA transmits a feedback frame (e.g., a compressed beamforming report frame). Otherwise, the feedback frame may not be generated/transmitted.

Additional Example of the Operation for Transmitting the NDP Trigger Frame from STA to AP The operation related to the NDP trigger frame transmitted from STA to AP has already been disclosed with reference to FIG. 21. In this case, the NDP-type frame transmitted from STA to AP may include a partial BSSID field as shown in FIG. 18(c) or FIG. 22.

The above-mentioned additional examples for allowing the STA to transmit the NDP PS-Pol frame to the AP may be similarly applied to the case in which STA transmits the NDP trigger frame to the AP, and as such a detailed description thereof will hereinafter be given.

AP having received the NDP trigger frame from the STA may determine whether the AP should answer the NDP trigger frame through the partial BSSID field. In this case, the partial BSSID may be composed of some bits (corresponding to a value obtained when the hashing function is applied to BSSID) of BSSID, so that respective partial BSSIDs of different BSSID vales may be identical to each other. Accordingly, if some APs corresponding to the same partial BSSID are present, plural APs may answer to the NDP trigger frame of the STA.

For example, it may be assumed that two APs (e.g., AP1 and AP2) having the same partial BSSID value are contiguous to each other, AP1 is associated with STA1, and AP2 is associated with STA2. If AID of STA1 is identical to AID of STA2, AP2 may mistake the NDP trigger frame transmitted from STA1 for the other NDP trigger frame transmitted from STA2. In this case, if data for STA2 is buffered in AP2, AP2 may attempt to transmit the buffered frame to STA2. In this case, if STA2 is in a doze state, the corresponding buffered frame may be retransmitted and discarded.

Therefore, in order to prevent the above-mentioned malfunction and the waste of resources, if the AP receives the NDP trigger frame from STA, although the partial BSSID value contained in the NDP trigger frame is identical to that of the AP, the fact that the corresponding NDP trigger frame will be transmitted from STA contained in other BSS to AP of the other BSS must be considered in operation. For this purpose, the following schemes are proposed.

In accordance with the first scheme, in order to allow STA having received the ACK frame answering the NDP trigger frame to receive the buffered frame from AP, the STA transmits the trigger frame (i.e., a 48-bit BSSID field (i.e., a full BSSID value)) to the AP, so that the STA may initiate the service period (SP).

In accordance with the second scheme, the AP having transmitted the ACK frame related to the NDP trigger frame from the STA should perform RTS/CTS frame exchange before transmitting the buffered frame to the STA, so that the AP may re-confirm whether the target STA attempting to transmit the buffered frame is an STA having transmitted the NDP trigger frame.

In accordance with the third scheme, the buffered frame transferred by the AP in response to the NDP trigger frame may not perform retransmission although a transmission failure occurs. Therefore, although transmission failure occurs, the frame buffered in the AP is continuously stored in the buffer, and may then be transmitted when the STA retransmits the trigger frame.

In accordance with the fourth scheme, the buffered frame transferred by the AP in response to the NDP trigger frame from STA may perform retransmission when a transmission failure occurs. In this case, although the number of retransmission times reaches a retry limit, the corresponding buffered frame may not be discarded. Therefore, after the number of retransmission times reaches the retry limit, the buffered frame may be continuously stored in the buffer, and may then be transmitted when STA retransmits the trigger frame.

In accordance with the fifth scheme, if the STA detects the presence of APs having the same partial BSSID, the corresponding STA may not use the NDP trigger frame.

In addition, similarly to the NDP PS-Poll frame, the previous TBTT offset field, instead of the partial BSSID field, may be additionally contained in the NDP trigger frame. AP may confirm whether an AP desired by STA is identical to the AP itself through the previous TBTT offset field contained in the NDP trigger frame. If it is determined that AP desired by STA is identical to the AP, the AP may transmit a frame answering the NDP trigger frame. Otherwise, the AP may not answer the NDP trigger frame.

Figure 27:
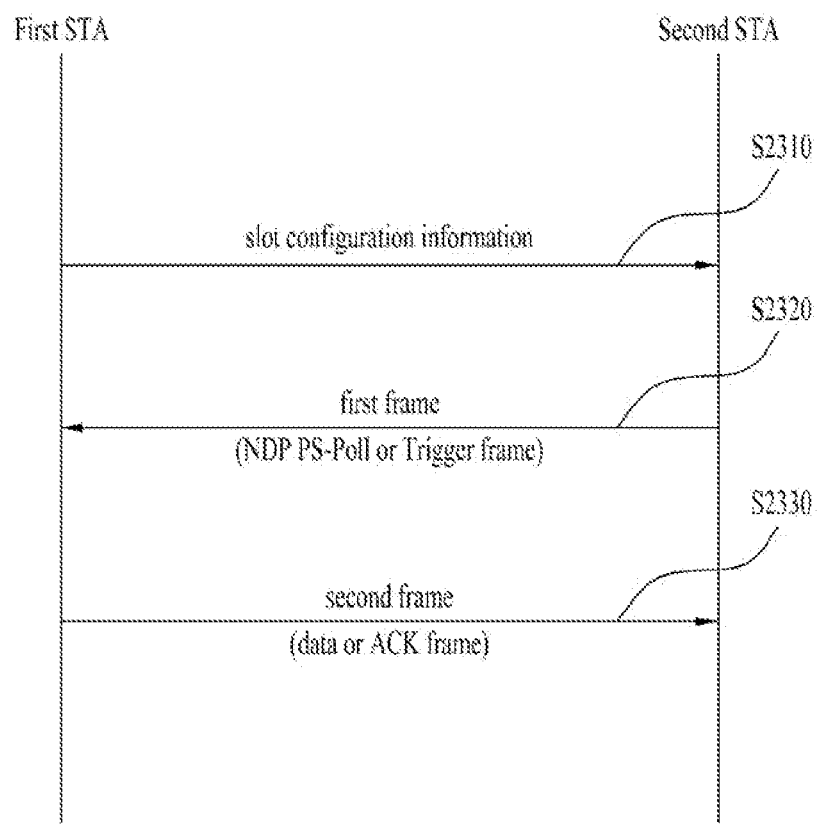
FIG. 27 is a conceptual diagram illustrating an STA-initiated slot based channel access method according to an exemplary embodiment.

FIG. 27 is a conceptual diagram illustrating an STA-initiated slot based channel access method according to an exemplary embodiment.

In step S2310, a first STA (e.g., AP) may transmit slot configuration information to a second STA (e.g., non-AP STA). The slot configuration information may indicate configuration information of at least one slot (e.g., RAW) allowed for the second STA attempting to perform channel access. The slot configuration information may be transmitted through a beacon frame. A more detailed description of the slot configuration is identical to those of the examples of the present invention, and as such a detailed description thereof will herein be omitted for clarity.

In step S2320, the second STA may transmit a first frame to the first STA. In this case, the first frame may be a PS-Poll frame or a trigger frame. In addition, the first frame may be the NDP frame. The first frame may be transmitted at one of the slots according to the contention scheme or the backoff scheme. A detailed description of not only a method for deciding the transmission time point of the first frame but also a detailed format of the first frame is identical to those of the examples of the present invention, and as such a detailed description thereof will herein be omitted for clarity.

In step S2330, the first STA may transmit a second frame corresponding to a response to the first frame to the second frame. The second frame may be an ACK frame of the PS-Poll or trigger frame. In case of the immediate data transmission scheme, the data frame may also be immediately transmitted.

In step S2330 and additional operations, categories of the second frame may be limited as illustrated in the additional example of the case of using the partial BSSID contained in the NDP-type frame, or the operations of STA and/or AP may be additionally defined. In addition, the previous TBTT offset value may be contained in the second frame.

Figure 28:
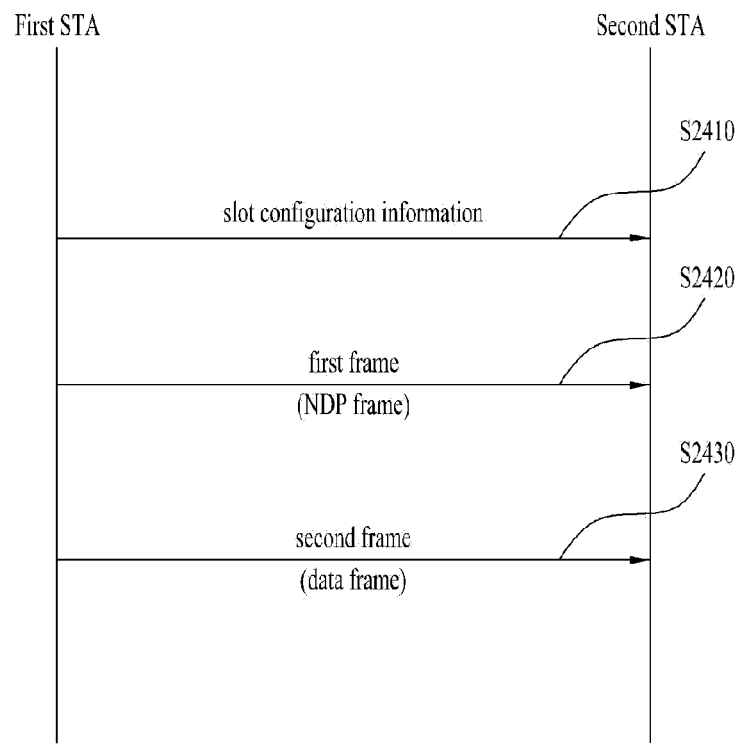
FIG. 28 is a conceptual diagram illustrating an AP-initiated slot based channel access method according to an exemplary embodiment.

FIG. 28 is a conceptual diagram illustrating an AP-initiated slot based channel access method according to an exemplary embodiment.

Step S2410 of FIG. 28 is identical to step S2310 of FIG. 27, and as such the same parts will herein be omitted for convenience of description.

In step S2420, the first STA (e.g., AP) may transmit a first frame including information for channel access of the second STA to the second STA (e.g., non-AP STA). In FIG. 28, the first frame may be an NDP frame transmitted by the first STA. In addition, the first frame may include specific information indicating the presence of AID (or PAID) of the second STA or the presence of buffered data (or BU) for the second STA. A detailed description of not only a method for deciding the transmission time point of the first frame but also a detailed format of the first frame is identical to those of the examples of the present invention, and as such a detailed description thereof will herein be omitted for clarity.

In step S2420, the channel access operation of the second STA may be initiated on the basis of the first frame sent to the second STA.

In step S2430, the first STA may transmit a second frame (e.g., a data frame) to the second STA. Although not shown in FIG. 28, the second STA may transmit a response frame (e.g., ACK frame) to the first frame to the first STA as shown in the example of FIG. 20.

In step S2420, when the first STA (e.g., AP) transmits the NDP frame to the second STA (e.g., non-AP STA), the NDP frame may include the previous TBTT offset field or the previous NDPA offset field.

The above described various embodiments of the present invention may be independently applied or two or more embodiments thereof may be simultaneously applied.

Figure 29:
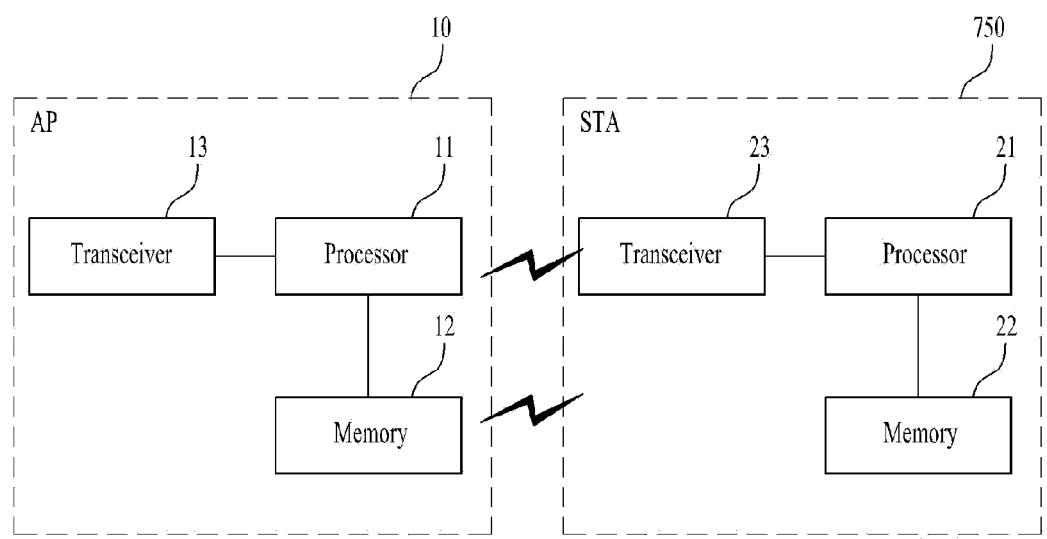
FIG. 29 is a block diagram illustrating a radio frequency (RF) device according to an embodiment of the present invention.

FIG. 29 is a block diagram illustrating a radio frequency (RF) device according to an embodiment of the present invention.

Referring to FIG. 25, an AP 10 may include a processor 11, a memory 12, and a transceiver 13. An STA 20 may include a processor 21, a memory 22, and a transceiver 13. The transceivers 13 and 23 may transmit/receive radio frequency (RF) signals and may implement a physical layer according to an IEEE 802 system. The processors 11 and 21 are connected to the transceivers 13 and 21, respectively, and may implement a physical layer and/or a MAC layer according to the IEEE 802 system. The processors 11 and 21 can be configured to perform operations according to the above-described embodiments of the present invention. Modules for implementing operation of the AP and STA according to the above described various embodiments of the present invention are stored in the memories 12 and 22 and may be implemented by the processors 11 and 21. The memories 12 and 22 may be included in the processors 11 and 21 or may be installed at the exterior of the processors 11 and 21 to be connected by a known means to the processors 11 and 21.

The overall configuration of the AP and STA may be implemented such that above described various embodiments of the present invention may be independently applied or two or more embodiments thereof may be simultaneously applied and a repeated description is omitted for clarity.

The above-described embodiments may be implemented by various means, for example, by hardware, firmware, software, or a combination thereof.

In a hardware configuration, the method according to the embodiments of the present invention may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, or microprocessors.

In a firmware or software configuration, the method according to the embodiments of the present invention may be implemented in the form of modules, procedures, functions, etc. performing the above-described functions or operations. Software code may be stored in a memory unit and executed by a processor. The memory unit may be located at the interior or exterior of the processor and may transmit and receive data to and from the processor via various known means.

The detailed description of the preferred embodiments of the present invention has been given to enable those skilled in the art to implement and practice the invention. Although the invention has been described with reference to the preferred embodiments, those skilled in the art will appreciate that various modifications and variations can be made in the present invention without departing from the spirit or scope of the invention described in the appended claims. Accordingly, the invention should not be limited to the specific embodiments described herein, but should be accorded the broadest scope consistent with the principles and novel features disclosed herein.

INDUSTRIAL APPLICABILITY

Although the above various embodiments of the present invention have been described based on an IEEE 802.11 system, the embodiments may be applied in the same manner to various mobile communication systems.

The invention claimed is:

1. A method for receiving a frame from an access point (AP) by a first station (STA), the method comprising:
   transmitting a first frame to the AP; and
   receiving from the AP a second frame in response to the first frame,
   wherein the first frame has a format of Null Data Packet (NDP) Power Saving-Poll (PS-Poll) frame and includes partial identification information of the first STA,
   wherein the partial identification information of the first STA is generated by using a part of a Basic Service Set Identifier (BSSID),
   wherein the second frame includes identification information of the second frame,
   wherein the identification information of the second frame is generated based on the partial identification information of the first STA included in the first frame, and
   wherein the second frame causes a second STA other than the first STA to not start a transmission of a third frame until an end of the transmission of the first frame and a reception of the second frame.

2. The method of claim 1, wherein:
   the first frame further includes partial identification information of the AP receiving the first frame,
   the second frame has a format of a NDP frame, and
   the identification information of the second frame is generated based on the partial identification information of the first STA included in the first frame and the partial identification information of the AP receiving the first frame.

3. The method of claim 1, wherein:
   the second frame includes a More Data (MD) field,
   if data for the first STA is buffered at the AP, the MD field is set to 1, or
   if the data for the first STA is not buffered at the AP, the MD field is set to 0.

4. The method of claim 3, wherein:
   if the MD field is set to 1, a service period for the first STA is started.

5. The method of claim 1, wherein:
   when a fourth frame with an End Of Service Period (EOSP) field set to 1 is received from the AP, the service period is ended.

6. The method of claim 1, wherein:
   the second frame is an ACK frame.

7. A method for transmitting a frame by an access point (AP) to a first station (STA), the method comprising:
   receiving a first frame from the first STA; and
   transmitting to the first STA a second frame in response to the first frame,
   wherein the first frame has a format of Null Data Packet (NDP) Power Saving-Poll (PS-Poll) frame and includes partial identification information of the first STA,
   wherein the partial identification information of the first STA is generated by using a part of a Basic Service Set Identifier (BSSID),
   wherein the second frame includes identification information of the second frame,
   wherein the identification information of the second frame is generated based on the partial identification information of the first STA included in the first frame, and
   wherein the second frame causes a second STA other than the first STA to not start a transmission of a third frame until an end of the transmission of the first frame and a reception of the second frame.

8. An apparatus of a first station (STA) for receiving a frame from an access point (AP), the apparatus comprising:
   a transceiver; and
   a processor,
   wherein the processor is configured to control the transceiver to:
      transmit a first frame to the AP; and
      receive from the AP a second frame in response to the first frame,
   wherein the first frame has a format of Null Data Packet (NDP) Power Saving-Poll (PS-Poll) frame and includes partial identification information of the first STA,
   wherein the partial identification information of the first STA is generated by using a part of a Basic Service Set Identifier (BSSID),
   wherein the second frame includes identification information of the second frame,
   wherein the identification information of the second frame is generated based on the partial identification information of the first STA included in the first frame, and
   wherein the second frame causes a second STA other than the first STA to not start a transmission of a third frame until an end of the transmission of the first frame and a reception of the second frame.

9. An apparatus of an access point (AP) for transmitting a frame to a first station (STA), the apparatus comprising:
   a transceiver; and
   a processor,
   wherein the processor is configured to control the transceiver to:
      receive a first frame from the first STA; and
      transmit to the first STA a second frame in response to the first frame,
   wherein the first frame has a format of Null Data Packet (NDP) Power Saving-Poll (PS-Poll) frame and includes partial identification information of the first STA transmitting the first frame,
   wherein the partial identification information of the first STA is generated by using a part of Basic Service Set Identifier (BSSID),
   wherein the second frame includes identification information of the second frame,
   wherein the identification information of the second frame is generated based on the partial identification information of the first STA included in the first frame, and
   wherein the second frame causes a second STA other than the first STA to not start a transmission of a third frame until an end of the transmission of the first frame and a reception of the second frame.

* * * * *